United States Patent [19]

Iwaki et al.

[11] Patent Number: 5,132,811
[45] Date of Patent: Jul. 21, 1992

[54] HOLOGRAPHIC OPERATING OPTICAL APPARATUS

[75] Inventors: Tadao Iwaki; Yasuyuki Mitsuoka; Shuhei Yamamoto, all of Tokyo, Japan

[73] Assignee: Seiko Instruments Inc., Japan

[21] Appl. No.: 545,913

[22] Filed: Jun. 28, 1990

[30] Foreign Application Priority Data

| Aug. 10, 1989 [JP] | Japan | 1-207483 |
| Apr. 6, 1990 [JP] | Japan | 2-92882 |
| Apr. 6, 1990 [JP] | Japan | 2-92883 |

[51] Int. Cl.$^5$ .............. G02B 27/46; G02F 1/135; G03H 1/16
[52] U.S. Cl. .................................. 359/6; 359/7; 359/72; 359/561
[58] Field of Search .............. 350/3.64, 342, 162.12, 350/162.13; 359/6, 7, 72, 561

[56] References Cited

U.S. PATENT DOCUMENTS

| 4,538,884 | 9/1985 | Masaki | 350/342 |
| 4,707,077 | 11/1987 | Marom | 350/342 |
| 4,722,594 | 2/1988 | Crossland et al. | 350/162.14 |
| 4,728,174 | 3/1988 | Grinberg et al. | 350/334 |
| 4,743,097 | 5/1988 | Johnson et al. | 350/342 |
| 4,762,397 | 8/1988 | Pepper | 350/342 |
| 4,772,101 | 9/1988 | Liu | 350/342 |
| 4,784,473 | 11/1988 | Gookin | 350/355 |
| 4,893,905 | 1/1990 | Efron et al. | 350/338 |

OTHER PUBLICATIONS

Flannery et al, "Transform-Ratio Ternary Phase-Amplitude Filter Transformation for Improved Correlation Discrimination," *Applied Optics*, vol. 27, No. 19, Oct. 1, 1988, pp. 4079 to 4083.
Vasil'ev et al, "Holographic Recording of Data Using a Time-Dependent Object Beam," *Soviet Journal of Quantum Electronics*, vol. 14, No. 2, Feb., 1984, pp. 276 to 277.
Liu et al, "Optical-Data-Processing Properties of a Liquid-Crystal Television Spatial Light Modulator," *Optic Letters*, vol. 10, No. 12, Dec. 1985, pp. 635 to 637.

*Primary Examiner*—Bruce Y. Arnold
*Assistant Examiner*—Martin Lerner
*Attorney, Agent, or Firm*—Bruce L. Adams; Van C. Wilks

[57] ABSTRACT

A holographic apparatus has an inferometer for concurrently irradiating an image recording medium by a writing reference light of spherical or plane wave form and a signal light containing image information which interfere with each other to form a hologram, and means for irradiating the hologram by a reading reference light in the opposite direction of the reference light to thereby reconstruct the image information. The image recording medium is comprised of a photoconductive layer, an optical reflective layer, a pair of liquid crystal alignment layers, a ferroelectric liquid crystal layer having bistable memory characteristic between its optical reflectivity and an applied voltage, means for applying the voltage and a pair of transparent substrates. The interferometer is preferably of the Mach-Zehnder type which includes along its signal light forming path an optical shutter, means for entering image information and an imagery optical system for optionally optically Fourier transforming the input image information and then enlarging the same to form the image on an otpical writing face of the light addressed liquid crystal light valve. By such construction, an extremely small holographic apparatus can be obtained to record and read the hologram in real time.

9 Claims, 13 Drawing Sheets

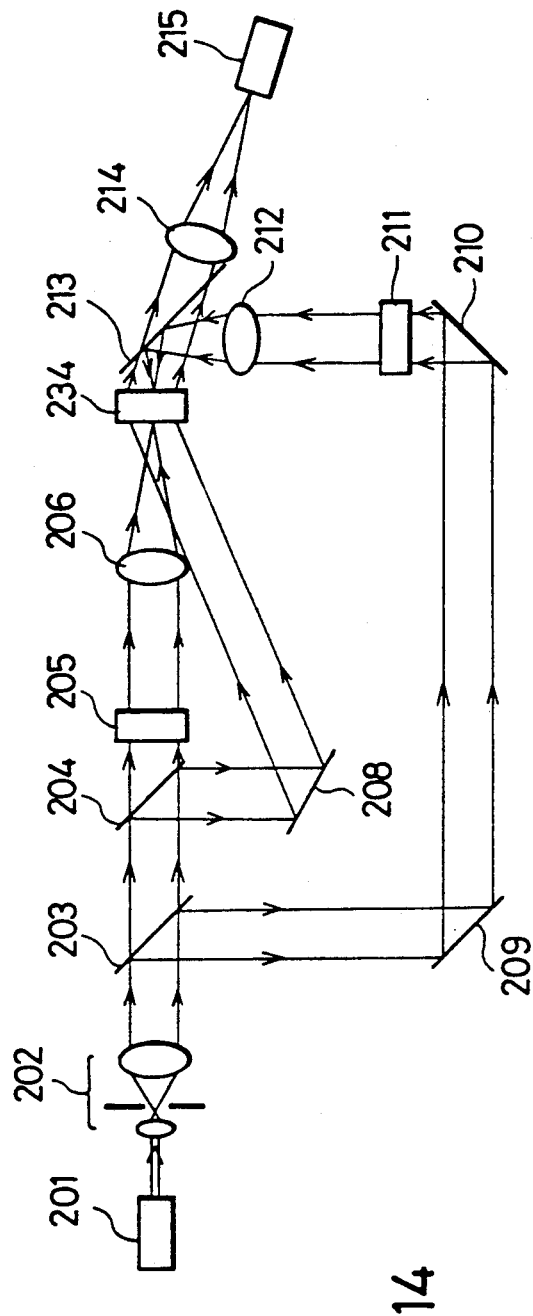
FIG. 13
FIG. 14
A
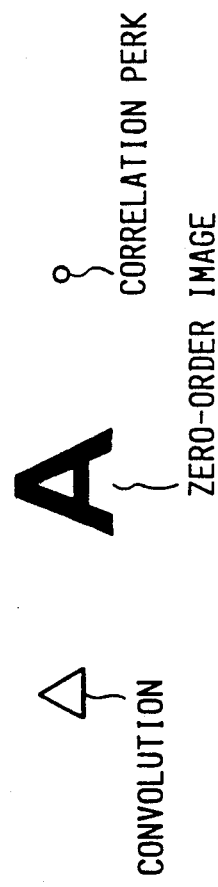
FIG. 15
△ CONVOLUTION
A ZERO-ORDER IMAGE
∘ CORRELATION PERK

HOLOGRAPHIC OPERATING OPTICAL APPARATUS

BACKGROUND OF THE INVENTION

The present invention relates to an optical holographic apparatus for recording and reconstructing optical holograms in optical information processing or display technology. The present invention also relates to an optical interconnection apparatus for effective switching of optical paths in optical information processing, optical communication and optical measurement. The present invention further relates to an apparatus for applying optical correlation processing to a two-dimensional image obtained from an image sensor such as a CCD camera to effect automatic pattern recognition or measurement in the field of optical information processing and optical measurement. The present invention still further relates to a method of driving a holographic application apparatus for applying optical correlation processing to a two-dimensional image obtained from an imaging device such as a CCD camera to effect automatic pattern recognition and measurement in the holographic application field of optical information processing and optical measurement, or for reconstruction from a holographic image.

Conventionally, much effort has been made to realize a real-time hologram by using a light addressed liquid crystal light valve. The light addressed liquid crystal light valve mainly utilizes twist nematic liquid crystal (TN type liquid crystal). Further, the conventional light addressed liquid crystal light valve utilizes a photoconductive layer composed of bismuth silicate crystal ($Bi_{12}SiO_{20}$ crystal) to record a hologram in order to reduce the wave number pitch of hologram interference fringes and to improve recording density and contrast of the reconstructed image, thereby achieving a recording density of 50–60 lp/mm and a reconstructed image contrast of 1:30, as disclosed in A. A. Vasil'ev et al., Sov. J. Quantum Electron. 14(2), Feb. 276–277 (1984).

However, the holographic apparatus utilizing the conventional light addressed liquid crystal light valve has a slow recording and reproducing speed of about several hundreds msec and has an insufficient contrast of the reconstructed image. Further, the conventional apparatus is difficult to handle because the light addressed liquid crystal light valve has to be stored in a dark space while applying thereto a voltage in order to maintain a hologram for a long time. Moreover, there is another problem in that an extremely large interferometer is needed due to a small angle between the reference light and signal light.

Conventionally, the optical interconnection has been studied as a basically important technology in the field of optical information processing, optical communication and optical measurement. Optical information processing is a key technology to such applications as optical interconnection between OEICs and interconnection between neurons in a neural network. Such interconnection has been realized by using holograms formed by silver salt photograph, thermoplastic or nonlinear optical crystal such as $BaTiO_3$ single crystal. In the field of optical communication and optical measurement, generally the switching of the optical path and spectrometer are carried out with a mirror, a half mirror prism or a diffraction grating. Further, in the optical communication field, holography, as mentioned above in the optical information processing, can be utilized for optical interchanging.

However, with regard to the conventional optical separating element such as a mirror, a half mirror prism and a diffraction grating, generally the light path is fixed, and selective switching of the light path is carried out by mechanical means, thereby resulting in low switching speed and difficult adjustment. Holograms using the silver salt photographic plate have a similar problem in that the switching of the light path is difficult. With regard to holograms using thermoplastics or nonlinear optical crystal such as $BaTiO_3$ single crystal, selective switching of the light path is possible, but thermoplastics need a great driving current and have a long response time in the order of at least several hundreds msec. The $BaTiO_3$ single crystal is operated in the temperature range of about 20° C.–130° C., and therefore it cannot be used in a lower temperature range. Further, it has problems such as the size of the crystal is limited and the crystal is rather expensive.

Conventionally, the optical correlator using a Fourier transform hologram (as a matched filter) features a high S/N ratio, hence it has been frequently used for the study of pattern recognition and optical computing. Generally, a photographic dry plate is utilized to produce a Fourier transform hologram because of its high resolution and wide dynamic range. Namely, a Fourier hologram of the codes or reference image is recorded and developed on the dry plate. However, this method cannot rewrite code images in real-time. FIG. 13 shows an optical correlator utilizing an optically writable TN liquid crystal spatial modulator operable to effect pattern recognition in real time.

In FIG. 13, a laser source 201 emits a light which is expanded by a beam expander 202 and then divided into two beams by a beam splitter 203. One of the two beams passing through the beam splitter 203 is again divided by a beam splitter 204 into two beams. One of the two beams passing through the beam splitter 204 illuminates a code image on a code plate 205 to form a corresponding coherent code image. Thereafter, the coherent code image is Fourier transformed by the first Fourier transform lens 206, and thereafter irradiates a writing face of a light addressed TN liquid crystal light valve 234 to thereby form a Fourier code image. On the other hand, the other beam reflected by the beam splitter 204 is again reflected by the first mirror 208 to thereafter irradiate the writing face of the TN liquid crystal light valve 234 in the form of a reference beam to interfere with the Fourier code image to form interference fringes. The interference fringes are then recorded on the TN liquid crystal light valve 234 in the form of a Fourier code hologram with grey scale. Further, the other beam reflected by the beam splitter 203 is sequentially reflected by the second mirror 209 and the third mirror 210, and irradiates an input image on the input plate 211 to convert the input image into a corresponding coherent input image. The coherent input image is Fourier transformed by the second Fourier transform lens 212 and then irradiates through a polarizing beam splitter 213 onto a reading face of the TN liquid crystal light valve 234 to form the Fourier input image. Consequently, the Fourier code hologram is read from the light addressed TN liquid crystal light valve 234. The read image is then Fourier transformed by the third Fourier transform lens 214 to form the correlation image which contains a correlation function and a convolution function between the code image and the input image and a zero-order light. The intensity of the correlation function is detected by a photodetector 215 so as to effect recognition.

In such construction, the code plate 205 is placed on the front focal plane of the first Fourier transform lens 206. The light addressed TN liquid crystal light valve 234 is placed on the back focal plane of the first Fourier transform lens 206, and on the back focal plane of the second Fourier transform lens 212, and on the front focal plane of the third Fourier transform lens 214. The input plate 211 is placed on the front focal plane of the second Fourier transform lens 212. The photodetector 21 is placed on the back focal plane of the third Fourier transform lens 214.

In the FIG. 13 structure, the light addressed TN liquid crystal light valve 234 can be replaced by a bismuth silicate ($Bi_{12}SiO_{20}$) crystal or a lithium niobate ($LiNbO_3$) crystal which constitutes a light addressed spatial light modulator operative according to pockels effect of electro-optic crystal or photoconducting effect. Further, in place of the light addressed spatial light modulator, an imaging device such as a CCD camera is utilized to convert the Fourier code hologram into a corresponding electric signal, which is then displayed on a liquid crystal television or a magneto-optic spatial light modulator, as disclosed, for example, in H. K. Liu, J. A. Davis and R. A. Lilly, Optics Letters, Vol. 10, No. 12, 1988 and in D. L Flannery, J. S. Loomis and M. E. Milkovich, Applied Optics, Vol. 27, No. 19, 1988.

However, with regard to the conventional optical correlator utilizing a light addressed spatial light modulator as a matched filter of a Fourier code hologram, the light addressed spatial light modulator has relatively low resolution. Further, though the image can be recorded in gray scale, the dynamic range is rather narrow so that a complicated Fourier hologram cannot be recorded and the S/N ration of the pattern recognition is low. The speed of the pattern recognition is in the order of several hundred msec for rewriting the Fourier code holograms, which is not practically sufficient.

With regard to the other conventional optical correlator utilizing an electrically addressed spatial light modulator as a matched filter of a Fourier code hologram, the Fourier code hologram can be binarized to improve the S/N ratio and the rewriting speed of the Fourier code holograms is on the order of several ten msec to achieve fast operation; however, the resolution is relatively low, on the order of several lp/mm, such that complicated image recognition cannot be effected.

Conventionally, a hologram recording medium is comprised of a light addressed TN liquid crystal light valve in a holographic application apparatus such as an optical correlator utilizing a Fourier hologram as a matched filter, and a holographic device for reconstructing a holographic input image. However, the conventional light addressed TN liquid crystal light valve has relatively low resolution. Further, though the image can be recorded in gray scale, the dynamic range is rather narrow so that a complicated Fourier hologram cannot be recorded and the S/N ration of the pattern recognition is low. The speed of the pattern recognition is on the order of several hundred msec for rewriting of the Fourier code holograms, which is not practically sufficient.

SUMMARY OF THE INVENTION

The invention is firstly directed to a holographic apparatus having an interferometer for concurrently irradiating a writing reference light, composed of spherical or plane waves, and a signal light, containing image information, onto an image recording medium to interfere with each other to record a hologram, and means for irradiating the hologram by a reading light in the opposite direction of the writing reference light to thereby reconstruct the image information. The image recording medium is comprised of a photoconductive layer, an optical reflective layer, a pair of liquid crystal alignment layers, a ferroelectric liquid crystal layer having bistable memory characteristic between its optical reflectivity and an applied voltage, means for applying the voltage and a pair of transparent substrates. Particularly, the interferometer is of Mach-Zehnder type including within its signal light forming path an optical shutter, means for entering image information and an imagery optical system for optionally optically Fourier transforming the input image information and then enlarging the same to effect image formation on an optical writing face of the light addressed liquid crystal light valve. By such construction, an extremely small holographic apparatus can be obtained so as to effect recording and reading of a hologram in real-time.

By such construction, the recording speed of the hologram becomes faster than 100 msec and the reproducing speed becomes faster than 1 msec to thereby achieve quite fast operation and the contrast of reconstructed image is increased to more than 1:50, thereby solving the problems noted above. By such construction, an extremely small holographic apparatus can be obtained so as to solve the problems of the prior art.

The light addressed liquid crystal light valve is operated by the following two steps in the inventive holographic apparatus. In the first step, while irradiating by an erasing light an entire writing face of the liquid crystal light valve, means for applying the voltage thereof is supplied with a DC bias voltage sufficiently higher than a lower threshold voltage determined under the irradiated or bright condition of the photoconductive layer, or with a DC bias voltage being optionally superposed with an AC voltage of 100 Hz–50 KHz, to thereby align the ferroelectric liquid crystal in one of the two bistable states to memorize or hold that state. Alternatively, without irradiating the optical writing face, means for applying the voltage is supplied with a DC bias voltage optionally superposed with an AC voltage of 100 Hz–50 KHz and sufficiently higher than an upper threshold voltage determined under the dark condition to align the liquid crystal in one of the bistable states to memorize that state.

In the second step, while means for applying the voltage is supplied with a DC bias voltage of opposite polarity superposed optionally with an AC voltage of 100 Hz–50 Hz and being lower than the upper threshold voltage determined for the dark condition and higher than the lower threshold voltage determined for the bright condition, the reference light and signal light are concurrently irradiated to interfere with each other on the writing face of the liquid crystal light valve to thereby form the hologram.

During the second step, means for entering the image information operates to input image information into the signal light. This means can be comprised of a liquid crystal light valve, a liquid crystal television, an electrochromic display device and a magneto-optic display device. The input image information is optionally Fourier transformed by a Fourier transform lens and then is enlarged by an enlarging lens to thereby effect formation of the input image on the writing face of the liquid crystal light valve.

In the second step, interference fringes are formed on a region irradiated by the reference and signal lights. Then the photoconductive layer generates carriers therein corresponding to the bright bands of the interference fringes, such that the generated carriers drift by the DC bias voltage in the direction of the electric field to thereby locally reduce the threshold voltage. Consequently, the bias voltage of the opposite polarity higher than the lower threshold voltage is applied to the ferroelectric liquid crystal layer corresponding to the bright bands of the interference fringes to induce selective inversion of a spontaneous dipole of the ferroelectric liquid crystal molecules to thereby selectively switch from one bistable state to the other bistable state to record the hologram. The thus recorded hologram can be read from the light having the same wavefront as that of the reference light in the opposite direction to reconstruct the input image.

The present invention is secondly directed to an optical interconnection apparatus for recording interference fringes caused between signal input light and reference light on a hologram recording medium to form a hologram to effect optical interconnection between the input and output lights. An optical system generating input lights with optical shutters is provided to control blocking and transmission of light for generating more than one input light. The hologram recording medium is comprised of a light addressed liquid crystal light valve composed of a photoconductive layer, an optical reflection layer, a pair of liquid crystal alignment layers, a ferroelectric liquid crystal layer having bistable memory characteristic between its optical reflectivity and an applied voltage, means for applying the voltage, and a pair of transparent substrates. By such construction, the hologram is momentarily recorded and erased to divide an input light selectively for getting a desired output optical path to thereby effect optical interconnection. Converging or diverging reference light can be utilized to produce converging or diverging output light. Further, an incident angle between the input and reference lights can be set to a given degree to effect spectral separation, thereby providing an optical interconnection apparatus of the general purpose type for use in optical information processing, optical communication and optical measurement.

By such construction, fast selective switching of optical paths can be achieved at a response time less than 500 μsec. The operating range is broadened from −20° C. to 60° C. which is sufficient to enable operation at room temperature. The effective area of the hologram recording medium is broadened more than 4 cm$^2$ to provide an inexpensive optical interconnection apparatus, thereby solving the problem of the prior art noted above.

In operation, the optical system generating the signal input light is provided with an optical shutter to control blocking and passing of light. The shutter is held open to pass the reference and input lights to effect interference therebetween on the photoconductive layer of the light addressed liquid crystal light valve to thereby form thereon the hologram effective to carry out the optical interconnection or distribution. A read light irradiates the hologram on a reading face of the light addressed liquid crystal light valve such that the read light is diffracted by the hologram to produce the output light in a desired direction. Therefore, in order to interfere between the reference and input lights at different incident angles, the optical system generating the input light is provided with the optical shutter to enable controlling of blocking and passing of the plural lights for selecting the incident angle according to a direction of the output light to record and erase the hologram sequentially to thereby selectively switch between multiple output light paths.

The present invention is thirdly directed to an optical correlator in which a matched filter is formed of a Fourier transformed hologram of a code image by using a coherent reference light and the matched filter is read by a Fourier transformed input image, the result of which is again Fourier transformed to produce a correlation image between the code image and input image. The Fourier transform hologram is recorded in the matched filter in binary form to thereby produce a correlation image output having a very high S/N ratio. Particularly, the matched filter can be comprised of a rewritable binary spatial light modulator such as a light addressed spatial light modulator utilizing optical modulating material composed of ferroelectric liquid crystal having a bistable memory characteristic of reflectivity in response to an applied voltage, thereby enabling fast and accurate pattern recognition.

The inventive optical correlation apparatus for effecting optical correlation processing of a two-dimensional image obtained from a CCD camera by using coherent light so as to automatically carry out recognition and measurement of a given pattern, is characterized by means for converting at least one code image including a matching image and at least one input image into corresponding coherent code image and coherent input image, means for Fourier transforming the coherent code image and the coherent input image into Fourier code image and Fourier input image independently from each other, means for enabling a coherent reference light of spheric wave or plane wave to interfere with the Fourier code image to form a Fourier code hologram, means including a binary spatial light modulator for converting the Fourier code hologram into a binarized intensity distribution image and recording the same, means for reading the binarized intensity distribution image recorded on the binary spatial light modulator by using the Fourier input image, and means for fourier transforming the read binarized intensity distribution image into a correlation image and for converting the correlation image into a corresponding output signal. By such construction, the pattern recognition can be carried out for a complex reference image with a high S/N ratio. In particular, the binary spatial light modulator comprises a light addressed liquid crystal light valve composed of a photoconductive layer, an optical reflection layer, a pair of liquid crystal alignment layers, a ferroelectric liquid crystal layer having a bistable memory characteristic between its optical reflectivity and an applied voltage, means for applying the voltage and a pair of transparent substrates. By such construction, the binarized Fourier hologram can be formed easily, and the Fourier hologram of reference images can be rewritten at high speed on the order of several msec, thereby enabling faster pattern recognition than the conventional optical correlator.

By the construction described above, the Fourier hologram of the code image can be recorded on the binary spatial light modulator in the form of the optically binarized intensity distribution image. Therefore, the recorded hologram interference fringes are made sharp to produce a clearer correlation function to thereby improve the S/N ration of the pattern recognition.

The light addressed liquid crystal light valve is comprised of the photoconductive layer, reflection layer, a pair of liquid crystal alignment layers, ferroelectric liquid crystal layer having bistable memory characteristic between its optical reflectivity and an applied voltage, means for applying the voltage, and a pair of transparent substrates so as to function as the binary recording device itself. Therefore, without additional image processing, the Fourier hologram irradiated and formed on the binary recording device can be automatically binarized and recorded in the form of a binarized intensity distribution. Further, the ferroelectric liquid crystal molecules have a dipole moment which can be reversed in response to an external electric field so as to record and erase the hologram to enable fast recording and reproduction of the hologram on the order of $\mu$sec to thereby achieve extremely fast pattern recognition.

The present invention is fourthly directed to a method of driving a holographic application apparatus such as an optical correlator which operates such that a code image is converted into a coherent code image and then Fourier transformed. Thereafter, a Fourier code image is recorded in the form of a binarized hologram on a light addressed ferroelectric liquid crystal light valve composed of a hydrogenated amorphous silicon photoconductive layer, reflective layer having a given transmittance, a pair of liquid crystal alignment layers, ferroelectric liquid crystal layer having a bistable memory characteristic between its reflectivity and an applied voltage, means for applying the voltage and a pair of transparent substrates. The recorded binarized hologram is read by a reading light formed from a Fourier input hologram and then Fourier transformed into a correlation image which can be detected by a detector.

The present invention is also directed to a method of driving a holographic apparatus which operates such that an input image is converted into a coherent input image and then optionally Fourier transformed. Thereafter, the input image is recorded int eh form of a binarized hologram on a light addressed ferroelectric liquid crystal light valve composed of a hydrogenated amorphous silicon photoconductive layer, a reflective layer having a given transmittance, a pair of liquid crystal alignment layers, a ferroelectric liquid crystal layer having a bistable memory characteristic between its reflectivity and an applied voltage, means for applying the voltage and a pair of transparent substrates. The recorded binarized hologram is read by a coherent reading light and optionally Fourier transformed to form and output image which can be detected by a detector.

According to the inventive method, while continuously irradiating a writing light which forms the Fourier holographic fringes or input image itself and the reading light which forms the Fourier input image, or which is composed of coherent spherical or plane wave, means for applying the voltage is operated to continuously apply to the light addressed ferroelectric liquid crystal light valve a pulse voltage such that voltage polarity to the hydrogenated amorphous silicon photoconductive layer sequentially and cyclicly changes between positive, negative and zero. Erasing of the image is carried out when the positive voltage is applied, writing of the image is carried out when the negative voltage is applied and reading of the image is carried out when the negative voltage or zero voltage is applied.

The pulse voltage is controlled to adjust its amplitude, frequency and pulse width when the positive, negative and zero voltage are applied so as to regulate an intensity or quality of the image, thereby achieving fast operation of the apparatus and facilitating the control of output characteristics thereof.

When reading light is irradiated onto a reading face of the light addressed ferroelectric liquid crystal light valve utilized in a holographic application, the incident reading light partially reaches the hydrogenated amorphous silicon photoconductive layer through the dielectric mirror as a reflective layer in the light valve and is absorbed in the surface region of the photoconductive layer to a depth of about 1 $\mu$m because the dielectric mirror has an optical transmittance sufficient to enable the incident reading light to act on the photoconductive layer. The absorption induces pairs of an electron and a hole such that the electrons move to a positive electrode and the holes move to a negative electrode. Since generally the mobility of electrons is several times to several ten times as great as that of the holes in the intrinsic or undoped hydrogenated amorphous silicon, the electrons are dominant in the electrical conductance.

Consequently, under the state where an erasing light in the form of the reading light is being irradiated, when a transparent electrode formed between the transparent substrate and the hydrogenated amorphous silicon photoconductive layer in opposed relation to the dielectric mirror is held at a positive voltage, the induced electrons are drawn to the positive voltage side across the photoconductive layer such that its impedance is abruptly reduced so as to reverse the ferroelectric liquid crystal molecules to thereby switch to a dark or erased state. On the other hand, if that transparent electrode is held at a negative voltage, the movable carrier are holes and the holes can not be effectively moved due to their low mobility so that the photoconductive layer substantially never reduces its impedance. Consequently, the ferroelectric liquid crystal molecules would not switch to the opposite bistable state, and therefore the erasing cannot be effected.

When a writing light is irradiated onto a writing face of the light valve which is opposite to the reading face while that electrode is held at the negative voltage, pairs of an electron and a hole are induced in a surface region of the photoconductive layer at the writing side such that electron carriers are moved toward the liquid crystal layer across the photoconductive layer so as to locally reduce impedance thereof at a potion selectively irradiated with the writing light. Consequently, a sufficient voltage is applied to the liquid crystal molecules to switch to a bright or writing state opposite to the dark or erasing state, thereby writing an image.

Consequently, according to the driving method described above, since the dielectric mirror provided in the light addressed ferroelectric liquid crystal light valve has an optical transmittance sufficient to enable the reading light to affect the hydrogenated amorphous silicon photoconductive layer, when the hydrogenated amorphous silicon photoconductive layer is held at the positive voltage, the image recorded on the light valve can be erased by the irradiation of an erasing light from the reading side so as to reset or initialize the light valve. On the other hand, when the photoconductive layer is held at the negative voltage, a holographic image can be written in the light valve by the irradiation of writing light from the writing side.

BRIEF DESCRIPTION OF THE DRAWINGS

FIG. 13 is a schematic diagram showing the conventional optical correlator;

FIG. 14 is a diagram showing an example of an input image and a code image:

FIG. 15 is a diagram showing a correlation peak image;

Embodiments

Figure 1:
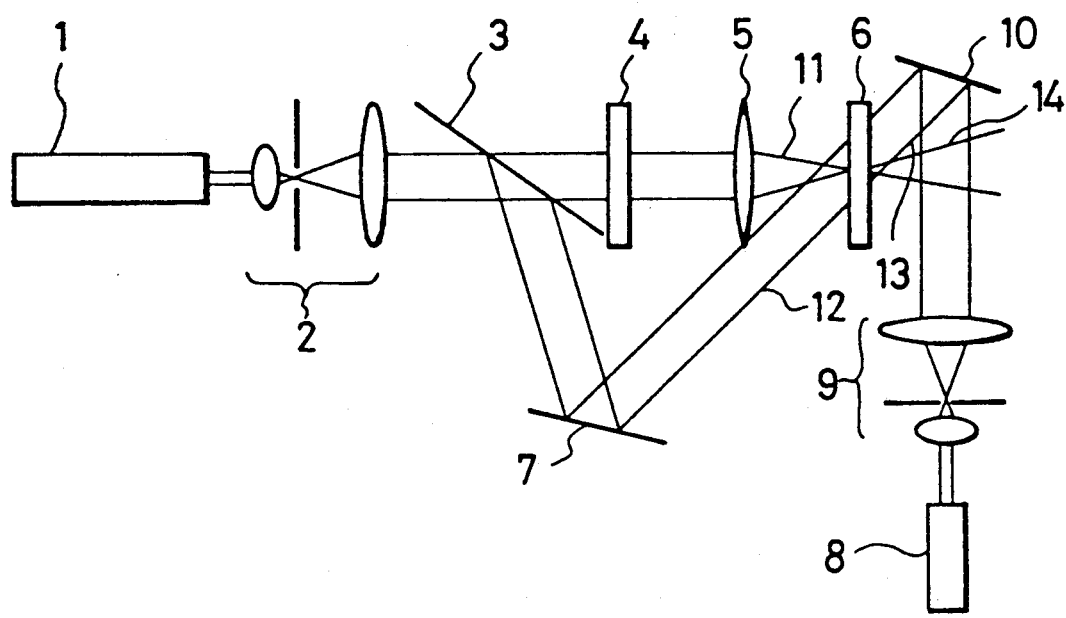
FIG. 1 is a basic structural diagram of the first embodiment of the inventive holographic apparatus.

Next, embodiments of the inventive holographic operating apparatus will be described with reference to the drawings. FIG. 1 is a basic structural diagram of a first embodiment of the inventive holographic apparatus. In FIG. 1, a writing laser source 1 can be comprised of a gas laser such as a He - Ne laser or a solid laser such as a semiconductor laser and a YAG laser. A coherent light emitted from the laser source 1 is expanded to a desired beam spot by the first beam expander 2, and then is divided into two paths by a beam splitter 3. One of the two divided beams is reflected by the first mirror 7 and then illuminates the writing face of a light addressed liquid crystal light valve 6 as a reference light 12. The other divided beam passes through means for entering image information 4 and is then Fourier transformed by a Fourier transform lens 5 to thereafter illuminate as a signal light 11 the writing face of the liquid crystal light valve 6. Accordingly, the reference light 12 and the signal light 11 interfere with each other on the writing face of the light valve 6 to thereby form an intensity pattern of interference fringes which is recorded on the light addressed liquid crystal light valve 6 as hologram interference fringes.

Means for entering image information 4 can be comprised of a light addressed liquid crystal light valve 6 shown in FIG. 1, a liquid crystal television, an electrochromic display device, a magneto-optic display device such as Faraday cell, and otherwise static device such as photographic dry plate.

In FIG. 1, before interfering the reference light 12 and the signal light 11 with each other to record hologram on the light valve 6, the light valve 6 is initially applied with a voltage greater than the upper threshold voltage under the dark condition or greater than the lower threshold voltage under the bright condition to uniformly erase or reset the light valve. At this time, when applying the voltage greater than the lower threshold voltage to effect erase, concurrently the reference light 12 is irradiated uniformly onto the writing face of the light valve while blocking or closing the means for entering image information 4.

Next, a second laser source 8 emits a coherent light, which is expanded into a desired beam diameter by a beam expander 9 and thereafter is reflected by a mirror 10 to form a reading light 13 in the opposite direction of the reference light 12 axially so as to illuminate a reading face of the light valve 6. By such operation, the hologram recorded on the light addressed light valve 6 can be read in the form of a reconstruction light 14 as shown in FIG. 1. When a size of the Fourier transform image formed by the signal light 11 would not be appropriate, an additional lens having a proper focal length would be arranged behind the back focal plane of the Fourier transform lens 5 so as to enlarge the Fourier transform image in a desired size to irradiate the writing face of the liquid crystal light valve 6. Means for entering an image information 4 and the liquid crystal light valve 6 are placed, respectively, on the front and back focal planes of the Fourier transform lens 5.

Figure 2:
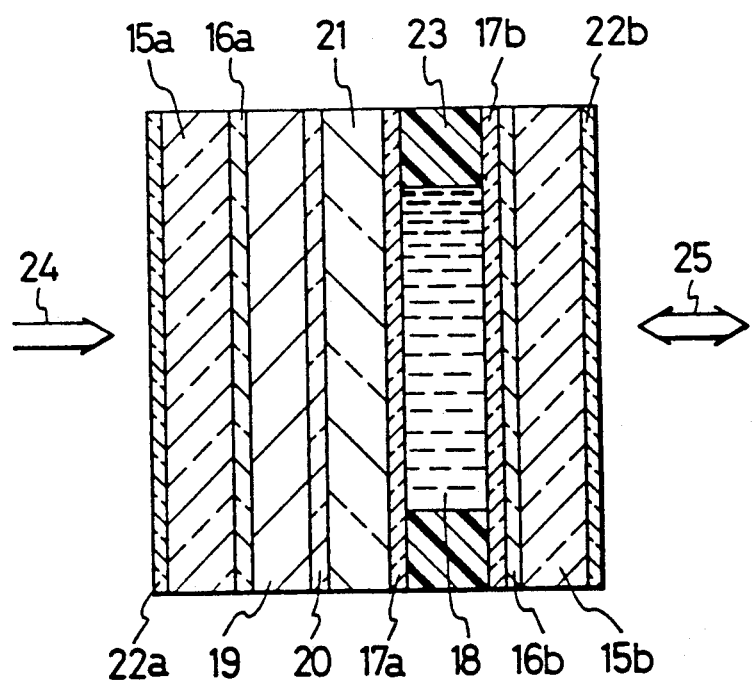
FIG. 2 is a sectional view of a light addressed liquid crystal light valve utilized in the inventive holographic apparatus.

Next, the description is given for the light addressed liquid crystal light valve. FIG. 2 is a sectional view of the light addressed liquid crystal light valve utilized in the inventive holographic apparatus.

In contrast to the structure of the conventional liquid crystal light valve, the liquid crystal layer is comprised of ferroelectric liquid crystal having bistability of optical transmittance or reflectivity in response to an applied voltage. The liquid crystal layer is sandwiched by a pair of transparent substrates 15a and 15b composed of glass or plastic. The substrates 15a and 15b are formed thereon with respective transparent electrode layers 16a and 16b, and respective alignment layers 17a and 17b formed by oblique evaporation of silicon monooxide in incident angle from 75° to 85° with respect to normal of the transparent substrate. The pair of transparent substrates 15a and 15b are coupled to each other with a gap controlled by a spacer 23 such that the alignment layers 17a and 17b are opposed to each other to sandwich therebetween the ferroelectric liquid crystal layer 18. Further, a photoconductive layer 19, an optical shielding layer 20 and a dielectric mirror 21 are sequentially laid in order on the transparent electrode layer 16a of an optical writing side between the electrode layer 16a and the alignment layer 17a. Anti-reflection coatings 22a and 22b are formed on respective outer faces of the writing side transparent substrate 15a and the reading side transparent substrate 15b.

The ferroelectric liquid crystal layer 18 contains a ferroelectric liquid crystal mixture added with optical active substance. The ester type SmC liquid crystal mixture is comprised of one part of 4-((4'-octyl)phenyl) benzoic acid (3''-fluoro, 4''-octyloxy)phenylester and one part of 4-((4'-octyloxy)phenyl) benzoic acid (3''-fluoro, 4''-octyloxy)phenylester. This mixture is added with 25 weight % of optical active substance of 5-octyloxynaphtalenecarboxylic acid, 1'-cyanoethylester to form the ferroelectric liquid crystal composition.

Further, the photoconductive layer 19 is comprised of hydrogenated amorphous silicon (a - Si : H) which is thermally stable at processing temperature of the light addressed liquid crystal light valve up to 200° C., which has a high resistivity under dark condition, and which has a great photoconductivity under the bright condition.

While the transparent electrode layers 16a and 16b are supplied with a DC bias voltage of opposite polarity superposed optionally with an AC voltage of 100 Hz-50 KHz and being lower than the upper threshold voltage determined for the dark condition of photoconductive layer and higher than the lower threshold voltage determined for the bright condition of photoconductive layer, the reference light 12 and signal light 11 are concurrently irradiated to interfere with each other on the writing face of the liquid crystal light valve through the transparent substrate 15a to thereby form the hologram of interference fringes.

Then, the photoconductive layer 19 generates carriers therein corresponding to bright bands of the interference fringes, such that the generated carrier drifts by the DC bias voltage in the direction of electric field to thereby reduce locally the threshold voltage. Consequently, the bias voltage of opposite polarity higher than the lower threshold voltage is applied to the ferroelectric liquid crystal layer correspondingly to the bright bands of the interference fringes to induce selective inversion of the spontaneous dipole of the ferroelectric liquid crystal molecules to thereby selectively switch from one bistable state to the other bistable state to record the hologram. Such a recorded hologram can be read from the light addressed liquid crystal light valve by a reading light having the same wavefront as that of the reference light in the opposite direction to reconstruct the input image. The reading light reflected from a region where the bright bands of the holographic interference fringes are recorded is rotated in the plane of polarization by 90°, while the remaining reading light is reflected without rotation of the plane of polarization from another region where the dark bands of the holographic interference fringes are recorded. Accordingly, the image can be reconstructed from both of the wavefront having the plane of polarization rotated 90° and representative of the interference bright bands, and the other wavefront having nonrotated polarization plane and representative of the interference dark bands or negative holographic interference fringes. Consequently, the hologram image can be reconstructed without optical absorption by irradiating the reading face of the liquid crystal light valve by the reading light.

Alternatively, the reading light is a linearly polarized light having a plane of polarization in parallel to (or orthogonal to) the preset alignment direction of liquid crystal molecules. This reading light is reflected by the optical reflection layer and passes through a polarizer having a polarization axis arranged orthogonal to (or in parallel to) the polarization direction of the reflected reading light to thereby read the hologram interference fringes in the form of light intensity information to reconstruct the image from the hologram. However, in such case that the hologram interference fringes are read out in the form of optical intensity information, only a part of the reading light from the area where the hologram interference fringes are recorded (or the area where they are not recorded) can be utilized to thereby cause reduction of hologram reconstruction efficiency.

Figure 3:
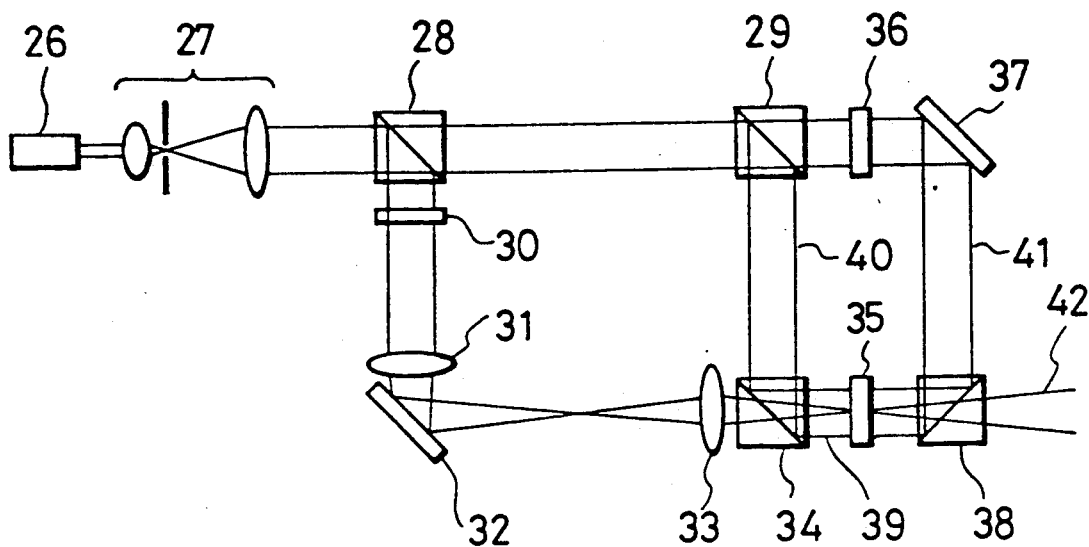
FIG. 3 is a basic structural diagram of a modification of the first embodiment of the inventive holographic apparatus utilizing a Mach-Zehnder interferometer.

Next, the description is given for reconstruction from the hologram utilizing a Mach-Zehnder interferometer. FIG. 3 is a basic structural diagram showing the inventive holographic apparatus utilizing a Mach-Zehnder interferometer. In FIG. 3, a coherent light emitted from a laser source 26 is expanded into a desired beam diameter by a beam expander 27 and thereafter is divided into two optical paths by the first beam splitter 28. One path of the divided coherent light is again divided by the second beam splitter 29, and then passes through the third beam splitter 34 to irradiate as a reference light 40 a writing face of a light addressed liquid crystal light valve 35.

On the other hand, the other part of the coherent light divided by the first beam splitter 28 passes through means for entering image information in the form of a liquid crystal TV 30 to form a coherent light containing the image information to enter a Fourier transform lens 31. The coherent light is then Fourier transformed by the Fourier transform lens 31 and is reflected by the first mirror 32. The liquid crystal TV 30 is placed on a front focal plane of the Fourier transform lens 31, and the Fourier image of the image information entered by the liquid crystal TV 30 is formed on a back focal plane of the Fourier transform lens 31. The Fourier image is converted into a signal light 39 by an imagery lens 33 to illuminate through the third beam splitter 34 the writing face of the light addressed liquid crystal light valve 35 to form an enlarged image. In this stage, the angle between the signal light 39 and the reference light 40 is adjusted by displacing the first mirror 32 in parallel to the direction of the Fourier transform lens 31 and by changing incident angle of the coherent light from the Fourier transform lens 31. At this time, as is described with reference to FIG. 1, the light addressed liquid crystal light valve 35 is initially held in the erased state. Thereafter, the light valve is applied with a DC bias voltage optionally superposed with an AC voltage of 100 HZ-50 KHz and having a voltage level lower than the upper threshold voltage for the dark condition and higher than the lower threshold voltage for the bright condition. In such a state, the reference light 40 and the signal light 39 are concurrently irradiated onto the writing face of the liquid crystal light valve 35 to form thereon the hologram containing the image information entered by the liquid crystal TV 30, so that the hologram is memorized.

Further, the other part of the coherent light divided by the second beam splitter 29 reaches an optical shutter 36. When the shutter 36 is open, the coherent light passes through the shutter 36 and then is reflected by the second mirror 37. Thereafter, the reflected coherent light is reflected by the fourth beam splitter 38 to form a reading light 41 having an optical axis aligned to that of the reference light so as to irradiate a reading face of light addressed liquid crystal light valve 35. The reading light 41 incident to the light valve 35 is diffracted by the holographic interference pattern recorded on the light valve to form a reconstruction light 42 effective to reproduce the input image information.

Figure 4:
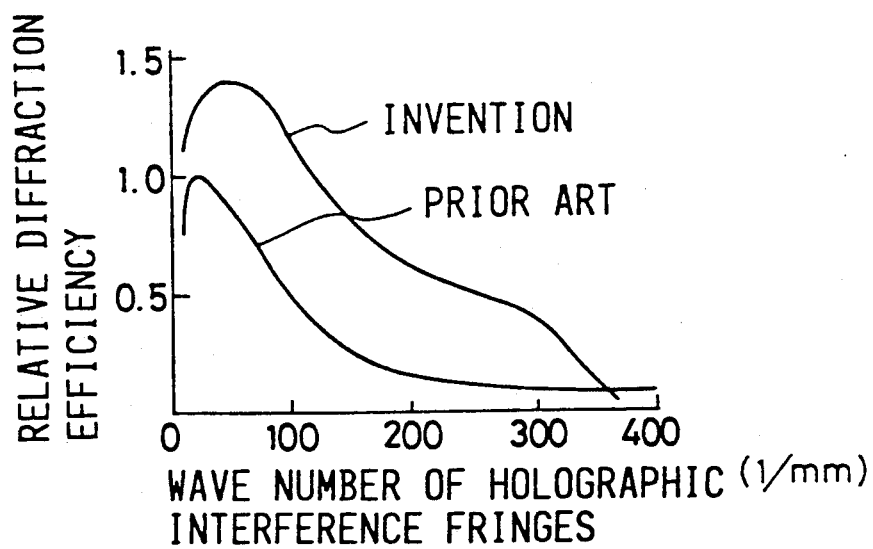
FIG. 4 shows the relation between the wave number of holographic interference fringe and the diffraction efficiency with respect to the inventive and conventional holographic apparatuses.

The next description is given for the recording and reconstructing feature of the hologram image in the inventive holographic apparatus. FIG. 4 is a graph showing the relation between wave number of holographic interference fringes and diffraction efficiency in the inventive and conventional holographic apparatuses. In FIG. 4, the horizontal axis indicates wave number of the holographic interference fringes when using a signal light having a coherent plane wave to record the hologram on the light addresses liquid crystal light valve, and the vertical axis indicates diffraction efficiency, which is represented by a relative value with respect to the maximum diffraction efficiency obtained by the conventional holographic apparatus using the conventional light addressed liquid crystal light valve. As seen from FIG. 4, the inventive holographic apparatus has an improved diffraction efficiency in the range below about 300 (1/mm) of wave number of holographic interference fringes as compared to the apparatus using the conventional light addressed liquid crystal light valve. However, the diffraction efficiency is abruptly reduced above 300 (1/mm) of wave number of holographic interference fringes in the inventive holographic apparatus, which would be caused by vibration etc.

As described above, it is preferable to operate the inventive holographic apparatus below 300-400 (1/mm) of wave number of holographic interference fringes, hence the angle between the reference light and the signal light is set to a small value below 6°-7° in the FIGS. 1 and 3 embodiments. Therefore, the Mach-Zehnder interferometer shown in FIG. 3 is preferable to facilitate recording of the hologram. Therefore, the Mach-Zehnder interferometer can avoid expansion of optical path length which would be needed otherwise to reduce the angle between the reference light and the signal light, thereby eliminating scale-up of the overall dimension of the apparatus to thereby facilitate mounting of means for entering an image information, A Fourier transform optical system or an imagery optical system in the interference optical system.

Further, in the inventive holographic apparatus, the light addressed liquid crystal light valve can effect fast recording of a hologram in under 100 μsec/frame by using a laser source composed of 20 mW He - Ne laser for hologram recording. Further, overall processing including hologram reconstruction can be carried out fast on the order of less than 1 msec. This means that recording and reconstructing of the hologram can be operated at the regular video rate which is effective to achieve image processing in real time. Further, the inventive holographic apparatus shown in FIG. 3 can be operated to reconstruct an image from a hologram at a considerable high contrast ration from 1:50 to 1:200.

As described above, the invention is directed to a holographic apparatus having an interferometer for concurrently irradiating a reference light composed of spherical or plane wave and a signal light containing image information onto an image recording medium to interfere with each other to record a hologram, and means for irradiating the hologram by the reading light in the opposite direction of the reference light to thereby reconstruct the image information. The image recording medium is comprised of a photoconductive layer, an optical reflective layer, a pair of liquid crystal alignment layers, a ferroelectric liquid crystal layer having a bistable memory characteristic between its optical reflectivity and applied voltage, means for applying the voltage and a pair of transparent substrates. Particularly, the interferometer is of the Mach-Zehnder type including an optical shutter forming its means for entering image information and an imagery optical system of optionally optically Fourier transforming the input image information and then enlarging the same to record the image on an optical writing face of the light addressed liquid crystal light valve. By such construction, an extremely small holographic apparatus can be obtained so as to record and read the hologram in real-time, thereby achieving considerable advantage in the optical information processing technology and the display technology. In particular, the invention is advantageous in the optical pattern recognition technology when applied with an optical correlator utilizing a holographic filter of the Vander-Lugt type.

Figure 5:
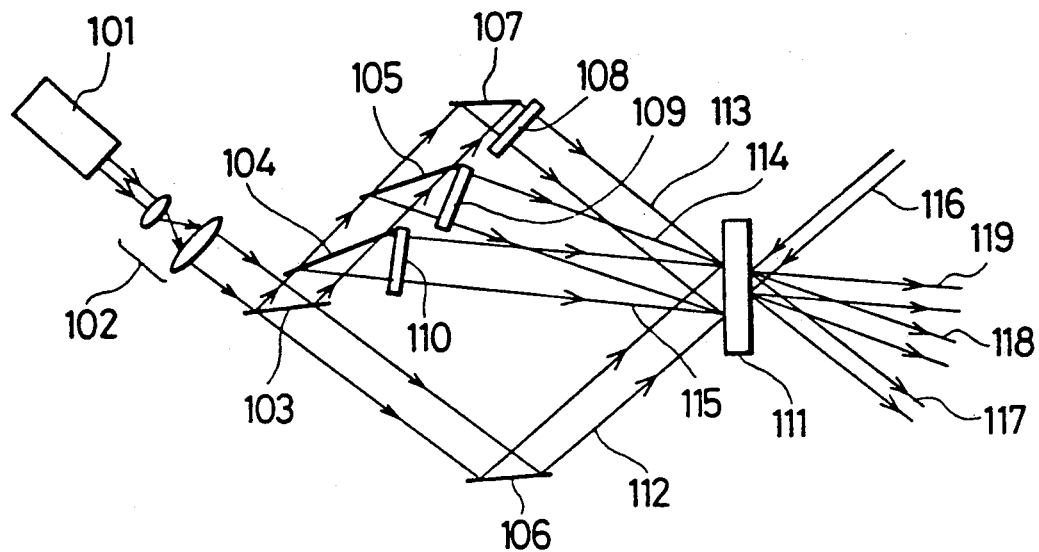
FIG. 5 is a schematic diagram showing the second embodiment of the inventive optical interconnection apparatus.

FIG. 5 is a schematic diagram showing the second embodiment of the inventive optical interconnection apparatus, which has three optical systems generating input beams. In FIG. 5, a laser beam emitted from a laser source 101 is expanded by a beam expander 102 into a given beam diameter, and then impinges on the first halfmirror 103 which is effective to divide the laser beam into a signal input beam and a reference beam. If a light addressed liquid crystal light valve 111 needs a relatively small hologram formation area, the beam expander 102 can be removed. One of the divided beams from the first halfmirror 103 is reflected by the first mirror 106 and then irradiates a writing face of the light addressed liquid crystal light valve 111 in the form of the reference beam 112. The other divided beam from the first halfmirror 103 is sequentially divided and reflected by the second halfmirror 104, the third halfmirror 105 and the second mirror 107 to thereby enter concurrently into the first optical shutter 108, the second optical shutter 109 and the third optical shutter 110.

At this stage, when the first shutter 108 is held open and the other shutter 109 and 110 are closed, the laser light passes only through the first shutter 108 to irradiate in the form of the first input beam 113 the writing face of the light valve 111, where the first input beam 113 interferes with the reference beam 112 to form a hologram on the light valve 111. In this state, a source beam 116 irradiates a reading face of the light valve 111 in the opposite direction of the reference beam 112 such that the source beam 116 is diffracted by the hologram to produce the first output beam 117 in the same direction as that of the first input beam 113.

In a similar manner, when the second shutter 109 is held open and the other shutters 108 and 112 are closed, the reference beam 112 and the second input beam 114 interfere with each other to form another hologram on the light valve 111. The common source light 116 is diffracted by this hologram to produce the second output beam 118 in the same direction as that of the second input beam 114. When the third shutter 110 is held open and the other shutters 108 and 109 are closed, the reference beam 112 and the third input beam 115 interfere with each other to form still another hologram on the light valve 111. The source light 116 is diffracted by this hologram to produce the third output beam 119 in the same direction as that of the third input beam 115. By thus controlling transmission of the first shutter 108, second shutter 109 and the third shutter 110, the light path can be momentarily selected to achieve the optical selective interconnection. The first halfmirror 103, the second halfmirror 104, the third halfmirror 105, the second mirror 107, the first shutter 108, the second shutter 109 and the third shutter 110 constitute the optical system generating input lights for producing more than one input beam.

The laser source 101 is comprised of a helium-neon laser. Otherwise, it can be comprised of an argon ion laser or a semiconductor laser. The first shutter 108, the second shutter 109 and the third shutter 110 are comprised of mechanical shutter. Otherwise, they can be comprised of optical shutters utilizing ferroelectric liquid crystal. Further, each optical system is arranged such that the maximum value of optical path difference is set less than the coherent length of the laser source 101 between the reference beam path and the respective one of the first input beam path, the second input beam path and the third input beam path.

Since the hologram has the minimum interference fringes 2-4 μm recordable on the light addressed liquid crystal light valve 111 utilized in the inventive optical interconnection apparatus, the incident angle is set to at most 9° between the input beam and the reference beam. Further, the intensity ration is set to 1:1 between the reference beam and each input beam in order to improve the interconnection efficiency.

Figure 6:
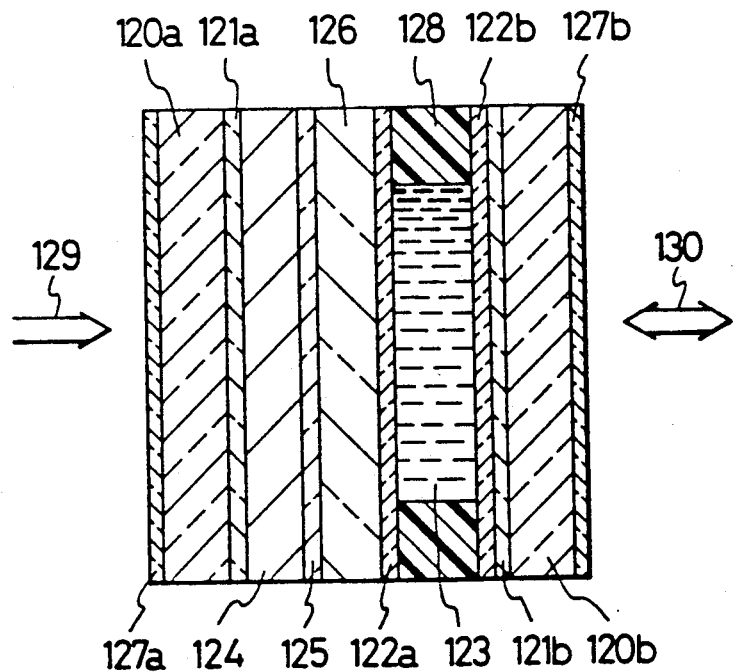
FIG. 6 is a sectional view of a light addressed liquid crystal light valve utilized in the inventive optical interconnection apparatus.

Next, the description is given for the light addressed liquid crystal light valve utilized as the hologram recording medium of the inventive optical interconnection apparatus. FIG. 6 is a sectional view of the light addressed liquid crystal light valve utilized in the inventive optical interconnection apparatus.

In contrast to the structure of the conventional liquid crystal light valve, the liquid crystal layer is comprised of ferroelectric liquid crystal having bistability of optical transmittance or reflectivity in response to an applied voltage. The liquid crystal layer is sandwiched by a pair of transparent substrates 120a and 120b composed of glass or plastic. The substrates 120a and 120b are formed thereon with respective transparent electrode layers 121a and 121b, and respective alignment layers 122a and 122b formed by oblique evaporation of silicon monoxide in incident angle from 75° and 85° with respect to normal of the transparent substrate. The pair of transparent substrates 120a and 120b are coupled to each other with a gap controlled by a spacer 128 such that the alignment layers 122a and 122b are opposed to each other to sandwich therebetween the ferroelectric liquid crystal layer 123.

Further, a photoconductive layer 124, an optical shielding layer 125 and a dielectric mirror 126 are sequentially laid in order on the transparent electrode layer 121a of the optical writing side between the electrode layer 121a and the alignment layer 122a. Antireflection coatings 127a and 127b are formed on respective outer faces of the writing side transparent substrate 120a and the reading side transparent substrate 120b.

While the transparent electrode layers 121a and 121b are supplied with a DC bias voltage of the opposite polarity superposed optionally with an AC voltage of 100 Hz-50 KHz and being lower than the upper threshold voltage determined for the dark condition and higher than the lower threshold voltage determined for the bright condition, the reference light 112 and one of the first, second and third signal lights 113, 114, 115 concurrently irradiate to interfere with each other on the writing face of the liquid crystal light valve to thereby form the holographic interference fringes of hologram.

Then, the photoconductive layer 124 generates carriers therein corresponding to bright bands of the interference fringes, such that the generated carriers drift by the DC bias voltage in the direction of the electric field to thereby reduce locally the threshold voltage. Consequently, the bias voltage of the opposite polarity higher than the lower threshold voltage is applied to the ferroelectric liquid crystal layer corresponding to the bright bands of the interference fringes to induce selective inversion of spontaneous dipole of the ferroelectric liquid crystal molecules to thereby selectively switch from one bistable state to the other bistable state to record the hologram. Such a recorded hologram can be read from the light addressed liquid crystal light valve by a source light having the same wavefront as that of the reference light in the opposite direction to reconstruct the signal light.

Namely, the source light reflected from a region where the bright bands of the holographic interference fringes are recorded is rotated in the plane of polarization by 90°, while the remaining source light is reflected without rotation of the plane of polarization from another region where the dark bands of the holographic interference fringes are recorded. Accordingly, the signal light can be reconstructed from both of the wavefront having 90°-rotated plane of polarization and representative of the interference bright bands, and the other wavefront having nonrotated plane of polarization and representative of the interference dark bands or negative holographic interference fringes. Consequently, signal light from the hologram can be reconstructed without optical absorption by the reading light onto the reading face of the liquid crystal light valve.

Alternatively, the reading light is a linearly polarized source light having the plane of polarization in parallel to (or orthogonal to) the preset alignment direction of liquid crystal molecules. This source light is reflected by the optical reflection layer and passes through a polarizer having a polarization axis arranged orthogonal to (or in parallel to) the polarization direction of the reflected reading light to thereby read the hologram interference fringes in the form of light intensity information to reconstruct the input signal light from the hologram. However, in such case that the hologram interference fringes are read out in the form of optical intensity information, only a part of the source light from the area where the hologram interference fringes are recorded (or the area where they are not recorded) can be utilized to thereby cause reduction of optical interconnection or reproduction efficiency.

The next description is given for the method of producing the light addressed liquid crystal light valve shown in FIG. 6. Transparent glass substrates are provided for the transparent substrates 120a and 120b, which are then formed with transparent electrode layers 121a and 121b in the form of ITO transparent electrode film. Then, gas whose composition is mainly of SiF$_4$ is subjected to discharge dissociation over the transparent electrode layer 121a on the writing side to form intrinsic hydrogenated amorphous silicon (a - Si : H) having 3 μm of thickness to constitute a photoconductive layer 124.

A shielding layer 125 is provided on the photoconductive layer 124, and Si or Si - Ge and SiO$_2$ are alternately laid with each other to form a dielectric mirror 126. The shielding layer 125 can be omitted if the reflectivity of the dielectric mirror 126 is great for visible light, sufficient to substantially block the affect of reading light to the photoconductive layer 124. Then, the substrate are set such that they are tilted relative to an evaporation source silicon monooxide (SiO) by an angle 82° between normal of the substrates and the evaporation direction. While monitoring a growth rate by a film thickness gage of the quartz crystal oscillator which are opposed normal to the evaporation direction, the liquid crystal alignment layers 122a and 122b are formed by the oblique evaporation on the dielectric mirror 126 and on the transparent electrode layer of the reading side, respectively, at 2000Å of film thickness. The transparent substrates 120a and 120b are coupled to each other by a spacer 128 composed of adhesive containing glass fiber of 1.5 μm diameter to control a gap therebetween such that the alignment layers 122a and 122b face to each other. A ferroelectric liquid crystal layer 123 is sandwiched between the alignment layers.

The ferroelectric liquid crystal layer contains a ferroelectric liquid crystal composition composed of ester type SmC liquid crystal mixture added with an optical active substance. The ester type SmC liquid crystal mixture is comprised of one part of 4-((4'-octyl)phenyl) benzoic acid (3''-fluoro, 4''-octyloxy)phenylester and one part of 4-((4'-octyloxy)phenyl) benzoic acid (3''-fluoro 4''-octyloxy)phenylester. This mixture is added with 25 weight % of optical active substance of 5-octyloxynaphthalenecarboxylic acid, 1'-cyanoethylester to form the ferroelectric liquid crystal composition.

Further, the photoconductive layer 119 is comprised of hydrogenated amorphous silicon (a - Si : H) which is thermally stable at the processing temperature of the light addressed liquid crystal light valve of up to 200° C., which has a high resistivity under dark condition, and which has a great photoconductivity under the bright condition.

Figure 7:
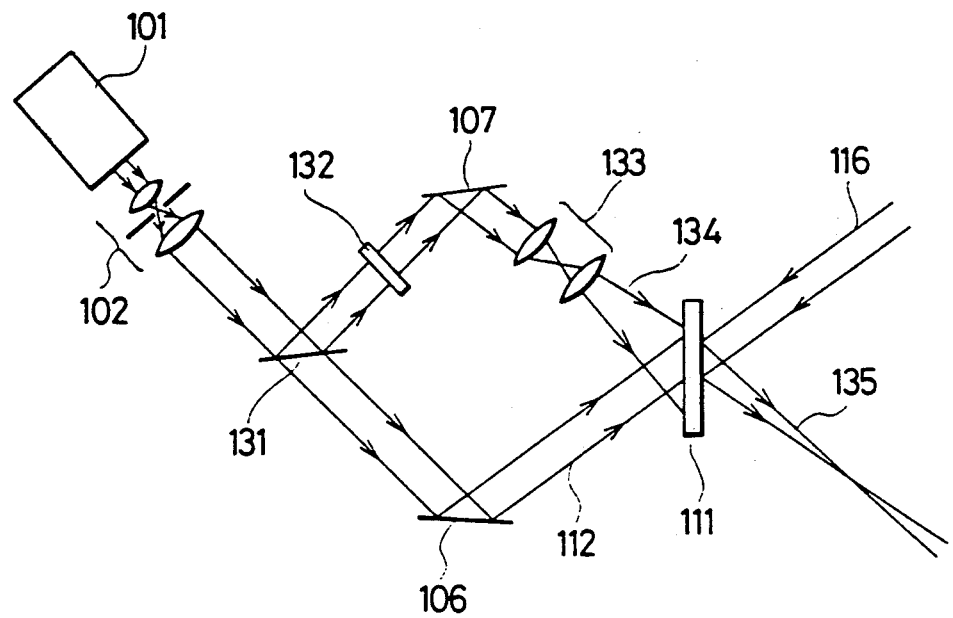
FIG. 7 is a schematic diagram showing a modification of the second embodiment where the inventive optical interconnection apparatus is applied for converging distribution of light.

FIG. 7 is a schematic diagram showing a modification in which the inventive optical interconnection apparatus is applied to the interconnection using converging light. The interconnection using converging light means that a interconnection light converges at a particular spot. The interconnection light converges without lenses. The FIG. 7 embodiment shows a single input beam, and it will be quite easy to increase the number of input beams.

In FIG. 7, a laser beam emitted from a laser source 101 is expanded by a beam expander 102 into a given beam diameter, and then enters into a halfmirror 131 to divide into two paths. One of the divided beams from the halfmirror 131 is reflected by the first mirror 106 and then irradiates a writing face of the light addressed liquid crystal light valve 111 in the form of the reference beam 112. The other divided beam from the first halfmirror 131 enters into an optical shutter 132. At this stage, when the first shutter 132 is held open, the laser light passes through the shutter 132, and then is diverged by a diverging lens system 133 to irradiate in the form of an input signal beam 134 the writing face of the light valve 111, where the input beam 134 interferes with the reference beam 112 to form a hologram on the light valve 111. In this state, a source beam 116 irradiates a reading face of the light valve 111 in the opposite direction of the reference beam 112 such that the source beam 116 is diffracted by the hologram to produce an output beam 135 in the same direction as that of the input beam 124. Since the input beam is diverging light, the output beam 135 is converged to a spot which is conjugate with the original diverging point of the input beam 134.

In the FIG. 7 embodiment of the optical interconnection apparatus, the shutter 132 is held in the open state so as to form a hologram on the light addressed liquid crystal light valve 111. Then the shutter 132 is turned to the closed state to erase the hologram for the optical switching. The switching time is about 500 μsec. This switching time can be reduced below about 100 μsec by boosting the output power of the laser source 101 and using a faster magneto-optic shutter as the switching shutter 132. The laser source 101 can be comprised of 20 mW helium-neon laser. Further, a converging optical system 133 in the FIG. 7 embodiment so as to form a diverging output beam.

Figure 8:
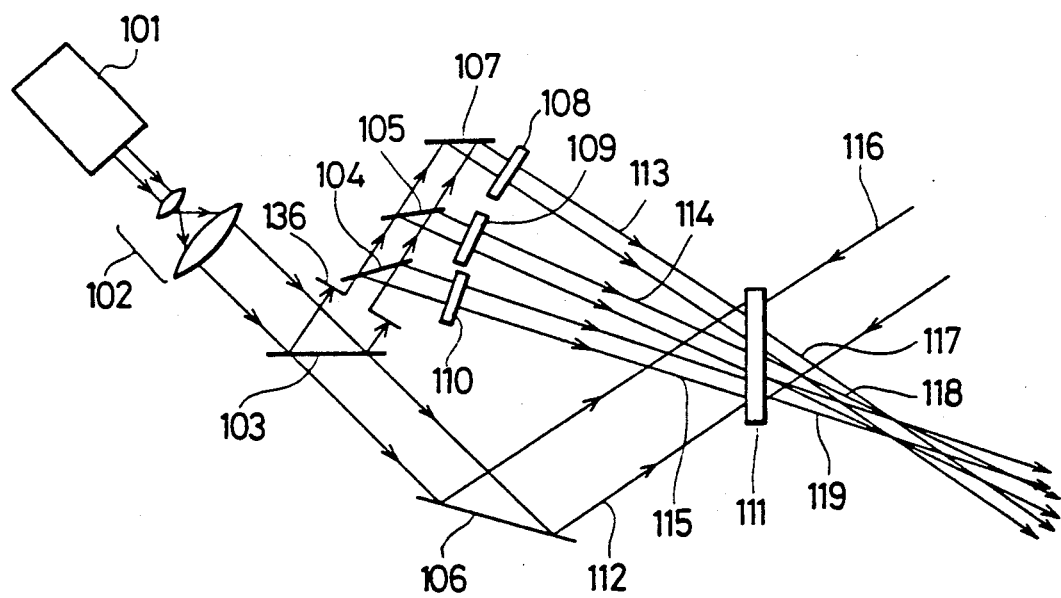
FIG. 8 is a schematic diagram showing another modification of the second embodiment where the inventive optical interconnection apparatus is applied for multi-interconnection.

FIG. 8 is a schematic diagram showing another modification in which the inventive optical interconnection apparatus is applied to a multi-interconnection of light beams. The multi-interconnection of light beams. The multi-interconnection means that light beams are concurrently interconnected to multi-directions, and is very important technology in the optical interconnection technology such as OEIC. The FIG. 8 embodiment differs from the FIG. 5 embodiment in the first input beam 113, the second input beam 114 and the third input beam 115 are not superimposed with each other on the writing face of the light addressed liquid crystal light valve. When at least one of the first optical shutter 108, the second optical shutter 109 and the third optical shutter 110 is held in the transmission state, an output beam is produced in the same direction as that of the input beam which has passed the open optical shutter. Namely, the number of optical shutters in the open state determines the number of output beam paths.

The reference beam 112 and each of the first input beam 113, the second input beam 114 and the third input beam 115 are superposed to each other to interfere on the writing face of the light valve 111, and incident angle therebetween is set below about 9°. The optical intensity ration between the reference beam and each input beam is set about 1:1. The maximum difference of the optical path length therebetween is set below the coherent interference length of the laser source 101 by suitably arranging the respective optical systems. It is confirmed that multi-interconnection into 25 number of outputs can be achieved with an optical interconnection apparatus similar to the FIG. 8 embodiment, thereby enabling OEIC interconnection having up to 25 number of I/O ports.

The next description is given for a spectrometer using the optical interconnection apparatus shown in FIG. 5. In FIG. 5, only the first shutter 108 is held in the open state to form a hologram with the first input beam 113 and the reference beam 112 to record the same on the light addressed liquid crystal light valve 111. Thereafter, the source light 116 in the form of white light irradiates the hologram so that blue light can be observed from the direction of the output beam 119. Then, the recorded hologram is erased from the light valve 111. Thereafter, only the second shutter 109 is held in the open state to record another hologram formed by the second input beam 114 and the reference beam 112 on the light valve 111. The white light irradiates the hologram so that green light can be observed from the direction of the output beam 119. Further, the recorded hologram is again erased from the light valve 121. Thereafter, still another hologram is recorded on the light valve 111 with using the third input beam 115 and the reference beam 112. Then, the source beam 116 in the form of white light irradiates the hologram, so that red-orange light can be observed from the direction of the output beam 119 in FIG. 5. The incident angle is set to about 5°, 4° and 3.5° for the first input beam 113, the second input beam 114 and the third input beam 115, respectively, relative to the reference beam 112. The laser source 101 is comprised of an argon ion laser which emits 514 nm laser beam. Accordingly, the inventive optical interconnection apparatus can be used as a spectrometer apparatus. However, the recordable wave number of the hologram interference fringes is less than about 200 lp/mm on the light addressed liquid crystal light valve used in the inventive spectrometer. This wave number is rather less than that of the diffraction grating used in the ordinary spectrometer, hence the wavelength resolution of the inventive separator is inferior to that of the ordinary spectrometer. However, the inventive spectrometer may be advantageous for use in optical information processing which does not require high accuracy but requires high speed operation.

Figure 9:
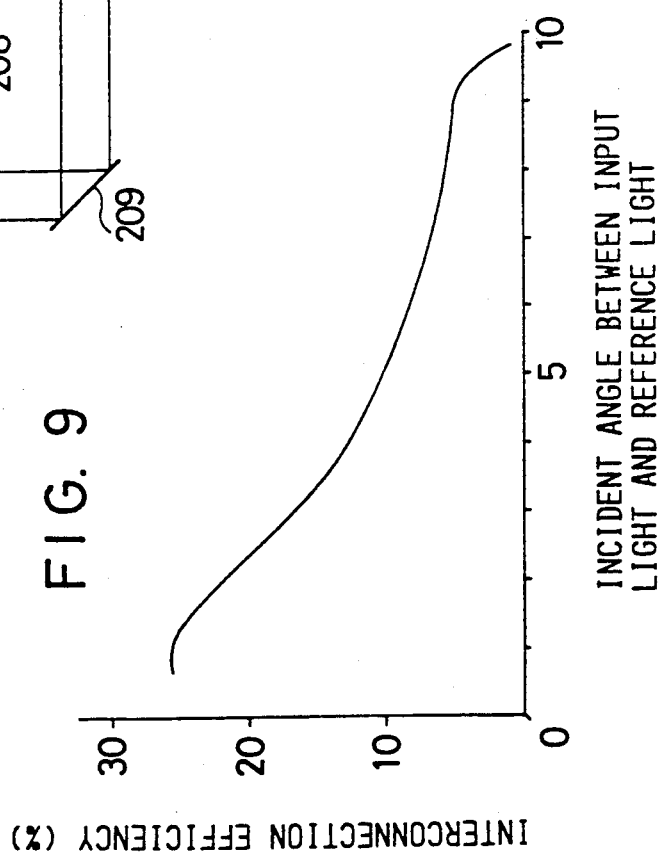
FIG. 9 is a graph showing the relation between the in interconnection efficiency and the incident angle of input beam relative to the reference beam in the inventive optical interconnection apparatus.

Lastly, the description is given for interconnection efficiency, i.e., output/input ration of the inventive optical interconnection apparatus. FIG. 9 shows the relation between the incident angle of the input beam relative to the reference beam and the interconnection efficiency. FIG. 9 is measured by using a writing or input laser source comprised of an argon ion laser having 514 nm wavelength, and a reading or output laser source comprised of helium-neon laser. At this time, the source light has a plane of polarization perpendicular (or parallel) to a wave number vector of the hologram interference fringes recorded on the light addressed liquid crystal light valve. When the plane of polarization of the source light is deviated from 90° or 180° relative to the wave number vector, the interconnection efficiency is reduced. Further, by changing the laser beam intensity of the writing laser source, or DC bias voltage, or frequency or amplitude of AC bias voltage so as to vary the threshold voltage of the light valve while recording the hologram, duty ratio of bright and dark bands of the holographic interference fringes can be adjusted to get the interconnection or diffraction efficiency.

As shown in FIG. 9, the incident angle should be limited less than about 9° between the input and reference beams in the inventive optical interconnection apparatus, thereby causing a drawback such as scale-up of the optical system. Such a drawback can be removed by utilizing a Mach-Zehnder interferometer for producing input and reference beams, or by utilizing another interferometer using a hologram formed by a silver salt photograph or a holographic recording medium coated with photosensitive resin such as photoresist or dichromate of gelatin. Further, the angular direction of the output beam can be suitably set by selecting the order of the light diffracted by the hologram recorded on the light addressed liquid crystal light valve.

Figure 10:
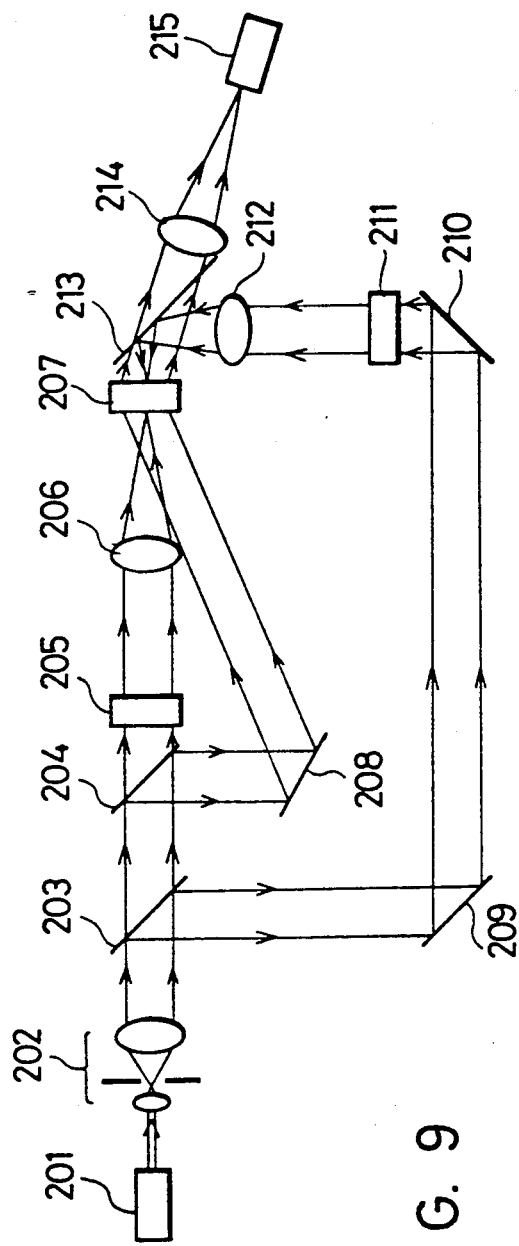
FIG. 10 is a schematic diagram showing the third embodiment of the inventive binary optical correlator.

Hereinafter, embodiments of the inventive binary optical correlator will be described in conjunction with the drawings. FIG. 10 is a schematic diagram showing the third embodiment of inventive binary optical correlator. As shown in FIG. 10, a laser source 201, a beam expander 202, the first beam splitter 203, the second beam splitter 204 and a code plate 205 altogether constitute means for converting at least one code or reference image including a given object or matching image into a corresponding coherent code image. The laser source 201, the beam expander 202, the first beam splitter 203, the second mirror 209, the third mirror 210 and an input plate 211 collectively constitute means for converting an input or signal image into a corresponding coherent input image. The first Fourier transform lens 206 and the second Fourier transform lens 212 placed separately from each other constitute means for Fourier transforming the coherent code image and the coherent input image independently of each other into corresponding Fourier code image and Fourier input image.

The second beam splitter 204 and the first mirror 208 constitute projection means for projecting a reference beam or means for enabling a coherent light of spherical wave or plane wave to interfere with the Fourier code image to form a Fourier code hologram. A light addressed binary spatial modulator 207 constitutes means for converting and binarizing the fourier code hologram into a binarized intensity distribution image and for recording or displaying the same. The second Fourier transform lens 212 and polarizing beam splitter 213 constitute means for reading the binarized intensity distribution image recorded on the binary spatial light modulator 207 with using the Fourier input image. The third Fourier transform lens 214 and a photodetector 215 constitute means for Fourier transforming the read intensity distribution image into a correlation image and for converting the correlation image into a corresponding electric output signal. The binary spatial light modulator 207 comprises a light addressed liquid crystal light valve composed of a photoconductive layer, an optical reflection layer, a pair of liquid crystal alignment layers, a ferroelectric liquid crystal layer having bistable memory characteristic between its reflectivity and applied voltage, means for applying the voltage and a pair of transparent substrates.

The laser source 201 emits a coherent light which is expanded by the beam expander 202 and then divided into two beams by the first beam splitter 203. One of the two beam passing through the first beam splitter 203 is again divided by the second beam splitter 204 into two beams. One of the two beams passing through the second beam splitter 204 illuminates a code image on a code plate 205 to form a corresponding coherent code image. Thereafter, the coherent code image is Fourier transformed by the first Fourier transform lens 206, and thereafter irradiates a writing face of the light addressed binary spatial light modulator 207 to thereby form a Fourier code image. On the other hand, the other beam reflected by the second beam splitter 204 is again reflected by the first mirror 208 to thereafter irradiate the writing face of the binary spatial light modulator 207 in the form of a reference beam to interfere with the Fourier code image to form interference fringes. The interference fringes are binarized by a given threshold level and is then recorded on the binary spatial light modulator 207 in the form of a binarized Fourier code hologram. Further, the other beam reflected by the first beam splitter 203 is sequentially reflected by the second mirror 209 and the third mirror 210 to convert an input image. The coherent input image is Fourier transformed by the second Fourier transform lens 212 and then irradiates a reading face of the modulator 207 through the polarizing beam splitter 213 to form the Fourier input image. Consequently, the binarized Fourier code hologram is read from the light addressed spatial light modulator 207. The read image is passed through the polarizing beam splitter 213 and is then Fourier transformed by the third Fourier transform lens 214 to form the correlation image which contains a correlation function and a convolution function between the code image and the input image. The produced intensity of the correlation function is detected by a photodetector 215.

In such construction, the code plate 205 is placed on the front focal plane of the first Fourier transform lens 206. The light addressed binary light spatial modulator 207 is placed on the back focal plane of the first Fourier transform lens 206, and on the back focal plane of the second Fourier transform lens 212, and on the front focal plane of the third Fourier transform lens 214. The input plate 211 is placed on the front focal plane of the second Fourier transform lens 212. The photodetector 215 is placed on the back focal plane of the third Fourier transform lens 214.

The pattern recognition is carried out according to the intensity of the correlation function at a correlation peak where the correlation function intensity becomes a maximum. Namely, the greater the correlation peak intensity becomes, the more the input image resembles the code or reference image. FIG. 14 shows an example of code and input images for use in the inventive binary optical correlator. FIG. 15 show a correlation image containing a correlation peak when using the code and input images shown in FIG. 14. As shown, the correlation image contains a central zero-order image which is a mirror image of the input or code image, and a pair of a correlation peak between the input and code images and a convolution peak at the opposite sides of the zero-order image. The correlation peak and convolution peak are aligned along a line perpendicular to the wave number vector of the interference fringes of the Fourier hologram. The distance from the zero-order image increases when the wave number of interference fringes of the Fourier hologram increases. The photodetector 215 is arranged to detect the correlation peak only.

Figure 11:
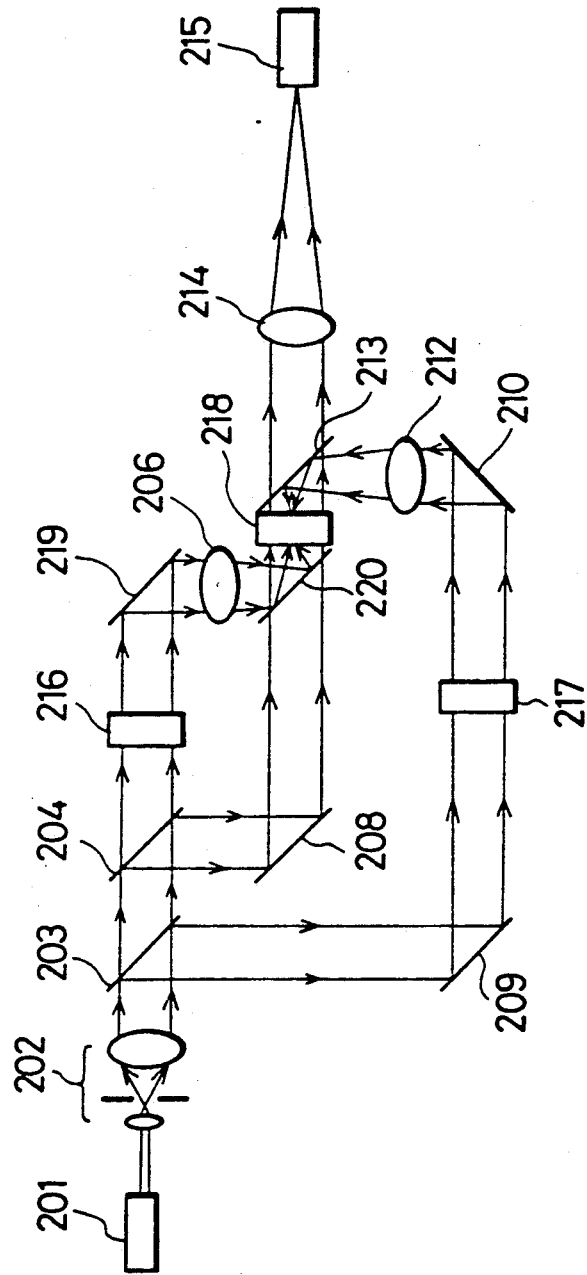
FIG. 11 is a schematic diagram showing a modification of the third embodiment of the inventive binary optical correlator utilizing Mach-Zehnder type interferometer.

The inventive binary optical correlator can be composed of a Mach-Zehnder interferometer. FIG. 11 is a schematic diagram showing such modification of the inventive binary optical correlator utilizing Mach-Zehnder interferometer. As shown in FIG. 11, a laser source 201, a beam expander 202, the first beam splitter 203, the second beam splitter 204 and the first liquid crystal television 216 altogether constitute means for converting at least one code or reference image including a given object or matching image into a corresponding coherent code image. The laser source 201, the beam expander 202, the first beam splitter 203, the second mirror 209, the second liquid crystal television 217 and the third mirror 210 collectively constitute means for converting an input or signal image into a corresponding coherent input image. The first Fourier transform lens 206 and the second Fourier transform lens 212 placed separately from each other constitute means for Fourier transforming the coherent code image and the coherent input image independently of each other into corresponding Fourier code image and Fourier input image.

The second beam splitter 204, the first mirror 208 and the third beam splitter 220 constitute means for enabling a coherent light of spherical wave or plane wave to interfere with the Fourier code hologram. A light addressed ferroelectric liquid crystal light valve 218 or binary spatial light modulator constitutes means for converting and binarizing the Fourier code hologram into a binarized intensity distribution hologram and for recording or displaying the same. The second Fourier transform lens 212 and a polarizing beam splitter 213 constitute means for reading the binarized intensity distribution hologram recorded on the binary spatial modulator by using the Fourier input image. The third Fourier transform lens 214 and a photodetector 215 constitute means for Fourier transforming the read intensity distribution hologram into a correlation image and for converting the correlation image into a corresponding electric output signal. The FIG. 11 embodiment operates in manner similar to the FIG. 10 embodiment according to the invention.

In the FIG. 11 construction, the first liquid crystal television 216 is placed on the front focal plane of the first Fourier transform lens 206. The light addressed ferroelectric liquid crystal light valve 218 is placed on the back focal plane of the first Fourier transform lens 206, and on the back focal plane of the second Fourier transform lens 212, and on the front focal plane of the third Fourier transform lens 214. The second liquid crystal television 217 is placed on the front focal plane of the second Fourier transform lens 212. The photodetector 215 is placed on the back focal plane of the third Fourier transform lens 214.

In the inventive binary optical correlator utilizing the Mach-Zehnder interferometer, optical path length can be shortened to form the Fourier hologram of the code image. Therefore, overall dimension of the interferometer can be reduced to thereby provide a sufficient space for accommodating means for entering an image such as the code plate 205 nd the first liquid crystal television 216 compactly, thereby providing practical advantage.

Figure 12:
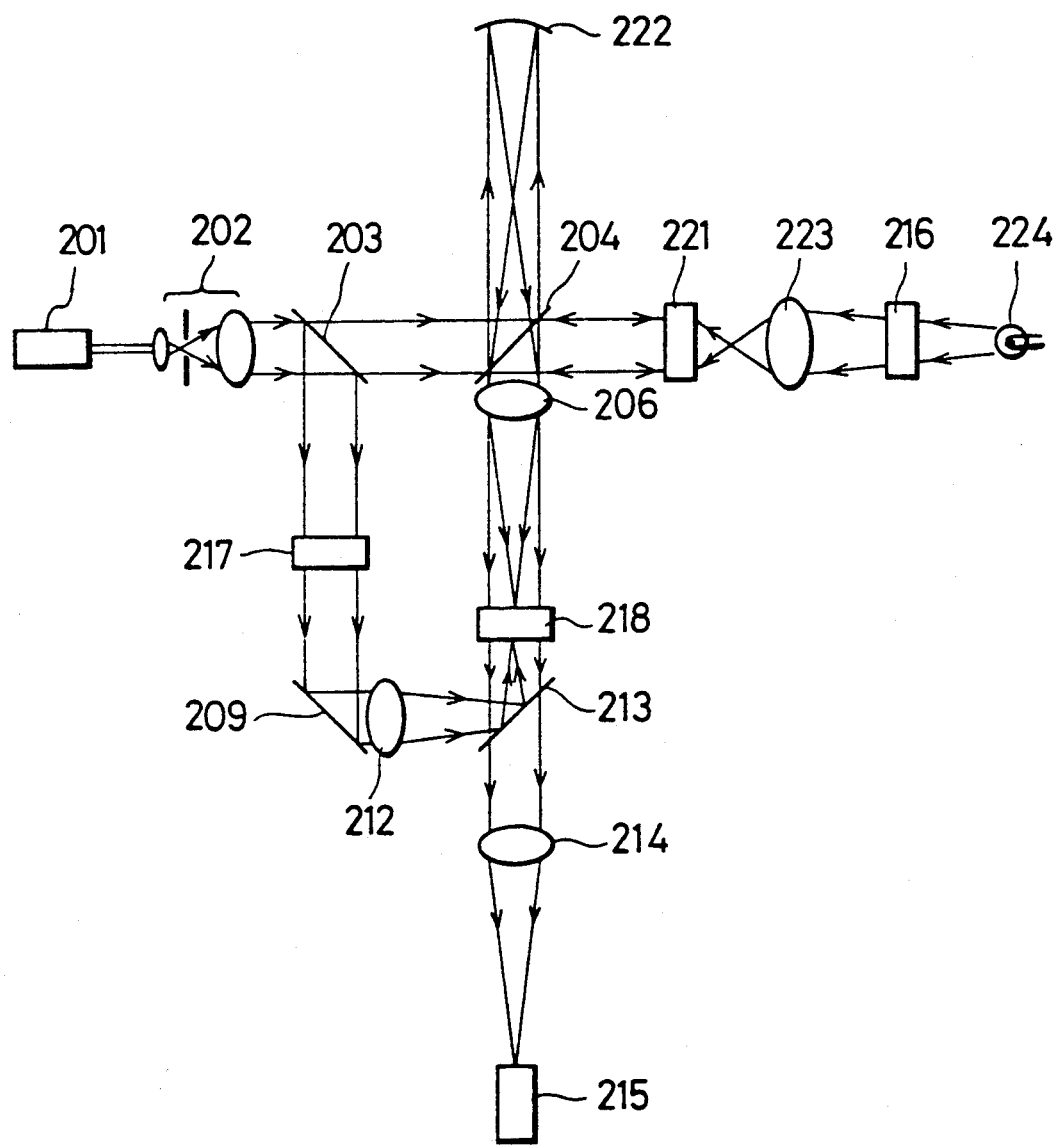
FIG. 12 is a schematic diagram showing another modification of the third embodiment of the inventive binary optical correlator utilizing a Michelson type interferometer.

Further, FIG. 12 is a schematic diagram showing another modification of the inventive binary optical correlator utilizing a Michelson interferometer. As shown in FIG. 12, a laser source 201, a beam expander 202, the first beam splitter 203, the second beam splitter 204, a light addressed liquid crystal light valve 221, a white light source 224, the first liquid crystal television 216 and an imagery lens 223 altogether constitute means for converting at least one code or reference image including a given object or matching image into a corresponding coherent code image. The laser source 201, the beam expander 202, the first beam splitter 203, the second liquid crystal television 217 and the second mirror 209 collectively constitute means for converting an input or signal image into a corresponding coherent input image. The first Fourier transform lens 206 and the second Fourier transform lens 212 placed separately from each other constitute means for Fourier transforming the coherent code image and the coherent input image independently of each other into corresponding Fourier code image and Fourier input image.

The second beam splitter 204, a concave mirror 222 and the first Fourier transform lens 206 constitute means for enabling a coherent light of spherical wave or plane wave to interfere with the Fourier code image to form a Fourier code hologram. A light addressed binary spatial modulator 218 in the form of a ferroelectric liquid crystal light valve constitutes means for converting and binarizing the Fourier code hologram into a binarized intensity distribution hologram and for recording or displaying the same. The second Fourier transform lens 212 and a polarizing beam splitter 213 constitute means for reading the binarized intensity distribution hologram recorded on the binary spatial light modulator by using the Fourier input image. The third Fourier transform lens 214 and a photodetector 215 constitute means for Fourier transforming the read intensity distribution hologram into a correlation image and converting the correlation image into a corresponding electric output signal. The binary spatial light modulator in the form of the light addressed liquid crystal light valve 218 is composed of a photoconductive layer, an optical reflection layer, a pair of liquid crystal alignment layers, a ferroelectric liquid crystal layer having bistable memory characteristic between its reflectivity and an applied voltage, means for applying the voltage and a pair of transparent substrates.

Further, the light addressed liquid crystal light valve 221 is composed of a photoconductive layer, an optical reflection layer, a pair of liquid crystal alignment layers, a ferroelectric liquid crystal layer having bistable memory characteristic between its reflectivity and an applied voltage, means for applying the voltage and a pair of transparent substrates.

The laser source 201 emits a coherent light which is expanded by the beam expander 202 and then divided into two beams by the first beam splitter 203. One of the two beams passing through the first beam splitter 203 is again divided by the second beam splitter 204 into two beams. On the other hand, the white light source 224 illuminates a code image displayed on the first liquid crystal television 216 into an incoherent code image. Thereafter, the incoherent code image irradiates a writing face of the liquid crystal light valve 22 through the imagery lens 223 and the code image is displayed thereon. A light beam passing through the second beam splitter 204 converts the code image displayed on the light valve 221 into a corresponding coherent code image. Thereafter, the coherent code image is Fourier transformed by the first Fourier transform lens 206, and thereafter irradiates a writing face of the light addressed ferroelectric liquid crystal light valve 218 to thereby form a Fourier code image. On the other hand, the other beam reflected by the second beam splitter 204 is again reflected by the concave mirror 222 and converted into a parallel beam by the first Fourier transform lens 206 to thereafter irradiate the writing face of the light valve 218 in the form of a reference beam to interfere with the Fourier code image to form interference fringes. The interference fringes are binarized by a given threshold level and is then recorded on the binary spatial light modulator 218 in the form of a binarized Fourier code hologram. Further, the other beam reflected by the first beam splitter 203 is passed through the second liquid crystal television 217 to convert an input image on the television 217 into a corresponding coherent input image. The coherent input image is reflected by the second mirror 209 and is Fourier transformed by the second Fourier transform lens 212 and then irradiates a reading face of the light valve 218 through the polarizing beam splitter 213 to form the Fourier input image. Consequently, the binarized Fourier code hologram is read from the light addressed light valve 218. The read image is passed through the polarizing beam splitter 213 and is then Fourier transformed by the third Fourier transform lens 214 to form the correlation image which contains a correlation function and a convolution function between the code image and the input image. The intensity of the correlation function is detected by the photodetector 215.

In such construction, the light valve 221 is placed on the front focal plane of the first Fourier transform lens 206. The light addressed ferroelectric liquid crystal light valve 218 is placed on the back focal plane of the first Fourier transform lens 206, and on the back focal plane of the second Fourier transform lens 212, and on the front focal plane of the third Fourier transform lens 214. The second liquid crystal television 217 is placed on the front focal plane of the second Fourier transform lens 212. The photodetector 215 is placed on the back focal plane of the third Fourier transform lens 214.

In this embodiment, the concave mirror 222 and the first Fourier transform lens 206 has the same focal length, and the focal plane of the concave mirror 222 coincides with the front focal plane of the first Fourier transform lens 206. The inventive binary optical correlator can utilize a device using electronic parts which is placed instead of the first liquid crystal television 216 and is directly illuminated with white light to directly input its reflected light or projected light to thereby constitute a compact optical correlator. Moreover, means for entering the code image can be composed of a light emission type display, such as a CRT and a plasma display, or reflection type liquid crystal display having a backlight source, instead of the first liquid crystal television 216.

When operating the binary correlators in FIG. 11 and FIG. 12 to carry out pattern recognition or comparison of the code and input images with each other as shown in FIG. 14, the obtained correlation peak intensity is 1.2 times as great as the obtained when the conventional optical correlator in FIG. 13 using the light addressed TN liquid crystal light valve is operated for the same pattern recognition, and the noise level is reduced to 1/10 in the conventional optical correlator. Further, the correlation peak width is reduced to about ½ a compared to the prior art for accurate pattern recognition. Moreover, the operation time can be reduced to 220–800 $\mu$sec in a cycle of pattern recognition to thereby achieve faster pattern recognition as compared to the prior art.

In the embodiments described above, the laser beam from the laser source 201 is divided by the first beam splitter 203 into two paths in order to produce the coherent code and input images independently of each other. Otherwise, a pair of laser sources can be used instead of a single laser source. In the embodiments described above, a single code image and a single input image are processed as shown in FIG. 14; however, a plurality of code images and a single input image can be processed concurrently, or a single code image and a plurality of input images can be processed concurrently, or a plurality of code images and a plurality of input images can be processed or compared at once. In the embodiments described above, the laser source 201 can be a gas laser, a semiconductor laser or a solid state laser having a good coherency.

As described above, the inventive binary optical correlator utilizes a light addressed binary spatial light modulator for converting the Fourier code hologram into the binarized intensity distribution hologram. The binary spatial light modulator is preferably comprised of a photoconductive layer, an optical reflection layer, a pair of liquid crystal alignment layers, a ferroelectric liquid crystal layer having bistable memory characteristic between its reflectivity and an applied voltage, means for applying the voltage and a pair of transparent substrates so as to constitute a light addressed liquid crystal light valve. By such construction fast pattern recognition can be carried out with a high S/N ratio, thereby realizing fast recognition and discrimination of image information.

Figure 16:
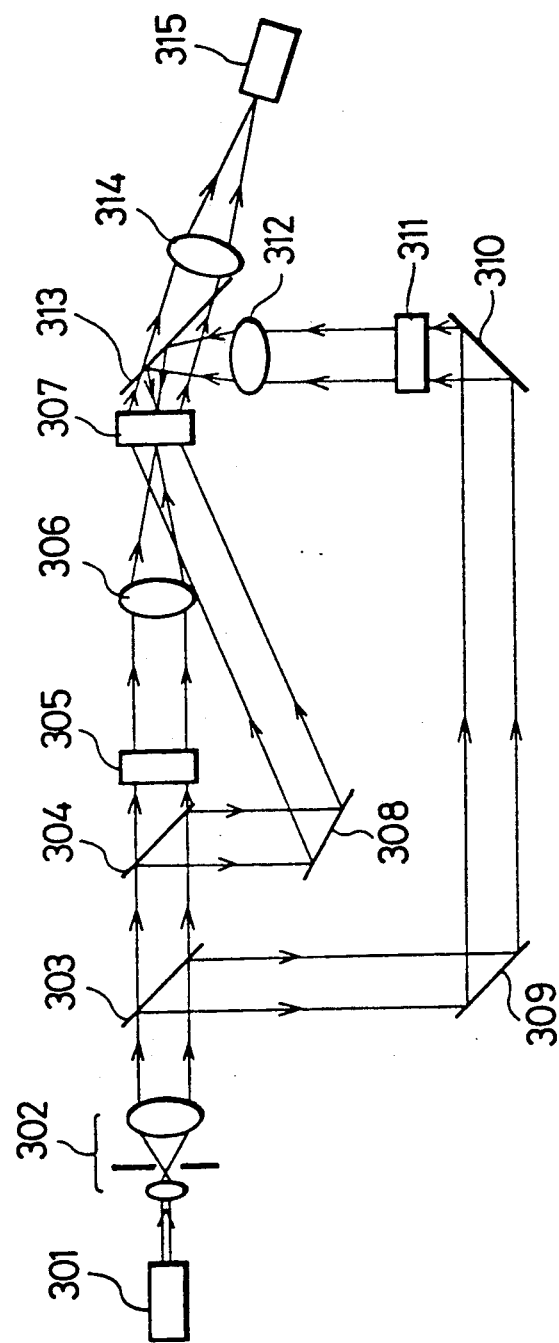
FIG. 16 is a schematic diagram showing the holographic binary optical correlator driven according to the inventive method.

Hereinafter, embodiments of the inventive method of driving holographic apparatuses will be described in conjunction with the drawings. FIG. 16 is a schematic diagram showing the binary optical correlator driven by the inventive method. As shown in FIG. 16, a laser source 301, a beam expander 302, the first beam splitter 303, the second beam splitter 304 and a code plate 305 altogether constitute means for converting at least one code or reference image including a given object or matching image into a corresponding coherent code image. The laser source 301, the beam expander 302, the first beam splitter 303, the second mirror 309, the third mirror 310 and an input plate 311 collectively constitute means for converting an input or signal image into a corresponding coherent input image. The first Fourier transform lens 306 and the second Fourier transform lens 312 placed separately from each other constitute means for Fourier transforming the coherent code image and the coherent input image independently of each other into corresponding Fourier code image and Fourier input image.

The second beam splitter 304 and the first mirror 308 constitute means for enabling a coherent light of spherical wave or plane wave to interfere with the Fourier code image to form a Fourier code hologram. A light addressed binary spatial light modulator or light valve 307 constitutes means for converting and binarizing the Fourier code hologram into a binarized intensity distribution hologram and for recording or displaying the same. The light valve 307 is comprised of a hydrogenated amorphous silicon photoconductive layer, a reflection layer having a given transmission rate, a pair of liquid crystal alignment layers, a ferroelectric liquid crystal layer having bistable memory characteristic between its reflectivity and applied voltage, means for applying the voltage and a pair of transparent substrates. The second Fourier transform lens 312 and the polarizing beam splitter 313 constitute means for reading the binarized intensity distribution hologram recorded on the binary spatial light modulator 307 by using the Fourier input image. The third Fourier transform lens 314 and the photodetector 315 constitute means for Fourier transforming the read intensity distribution hologram into a correlation image and for converting the correlation image into a corresponding electric output signal.

The laser source 301 emits a coherent light which is expanded by the beam expander 302 and then divided into two beams by the first beam splitter 303. One of the two beams passing through the first beam splitter 303 is again divided by the second beam splitter 304 into two beams. One of the two beams passing through the second beam splitter 304 illuminates a code image on the code plate 305 to form a corresponding coherent code image. Thereafter, the coherent code image is Fourier transformed by the first Fourier transform lens 306, and thereafter irradiates a writing face of the light addressed binary spatial light modulator 307 to thereby form a Fourier code image. On the other hand, the other beam reflected by the second beam splitter 304 is again reflected by the first mirror 308 to thereafter irradiate the writing face of the binary spatial light modulator 307 in the form of a reference beam to interfere with the Fourier code image to form interference fringes. The interference fringes are binarized by a given threshold level and are then recorded on the binary spatial light modulator 307 in the form of a binarized Fourier code hologram. Further, the other beam reflected by the first beam splitter 303 is sequentially reflected by the second mirror 309 and the third mirror 310 to convert an input image on the input plate 311 into a corresponding coherent input image. The coherent input image is Fourier transformed by the second Fourier transform lens 312 and then irradiates a reading face of the modulator 307 through the polarizing beam splitter 313 to form the Fourier input image. consequently, the binarized Fourier code hologram is read from the light addressed spatial light modulator 307. At this time, the Fourier input image irradiates the Fourier code hologram to make its axis coincide with that of the Fourier code hologram. The read image is passed through the polarizing beam splitter 313 and then Fourier transformed by the third Fourier transform lens 314 to form the correlation image which contains a correlation function and a convolution function between the code image and the input image. The intensity of the correlation function is detected by the photodetector 315.

In such construction, the code plate 305 is placed on the front focal plane of the first Fourier transform lens 306. The light addressed binary spatial light modulator 307 is placed on the back focal plane of the first Fourier transform lens 306, and on the back focal plane of the third Fourier transform lens 314. The input plate 311 is placed on the front focal plane of the second Fourier transform lens 312. The photodetector 315 is placed on the back focal plane of the third Fourier transform lens 314.

The input of the code and input images can be carried out by forming an image on a photographic dry plate, or by utilizing electrically addressed spatial light modulator such as a liquid crystal television, a magneto-optic modulator composed of yttrium iron garnet or gadolinium iron garnet and an electro-optic modulator composed of PLZT or $LiNO_3$, or by projecting an article image directly onto the light addressed spatial light modulator to record thereon an input image.

The input image is recognized according to a level or height of the correlation peak which has the maximum intensity in the correlation image. Namely, the greater the level of the correlation peak, the more the input image resembles the code image.

Figure 17:
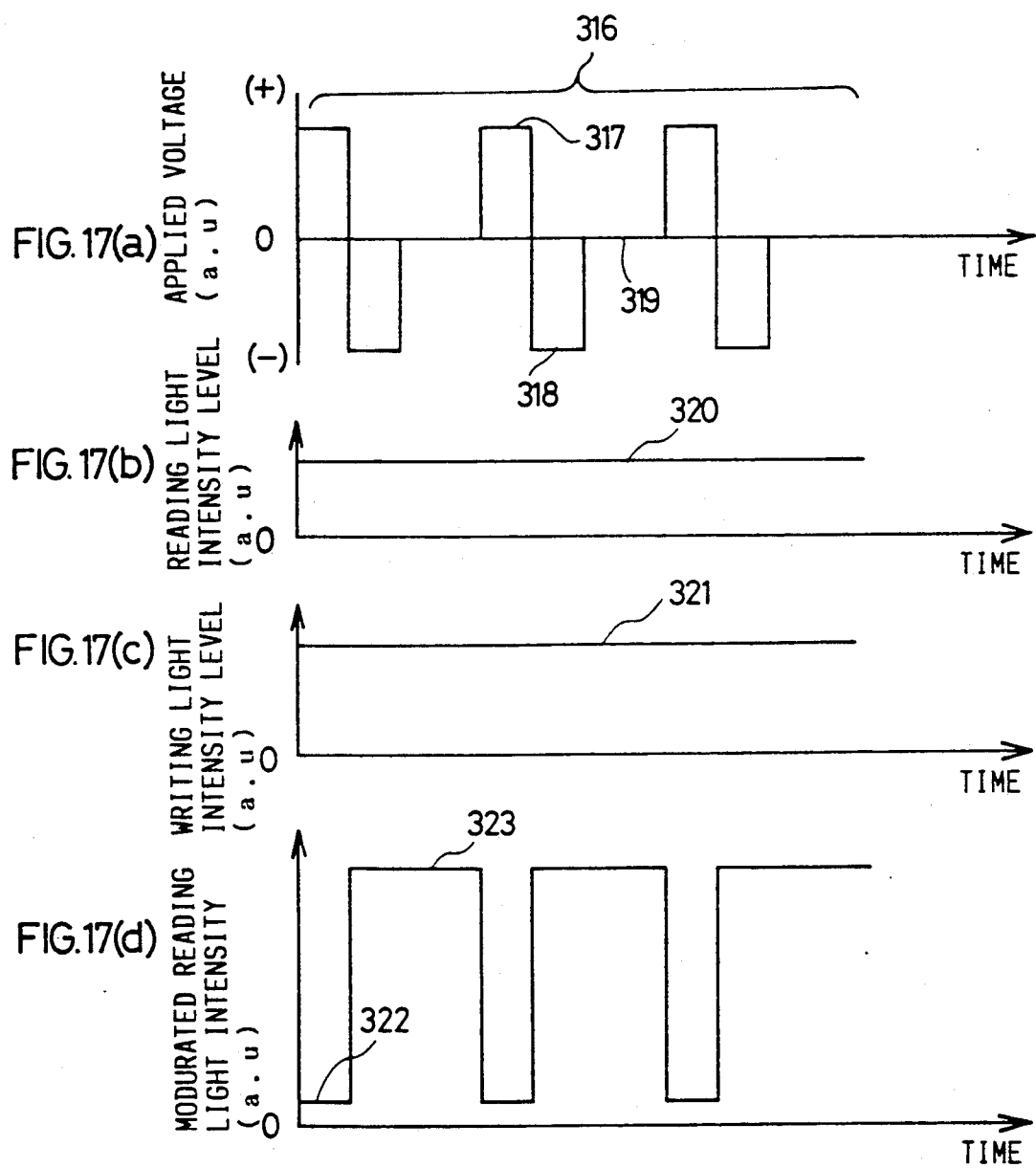
FIGS. 17(a) to (d) is a diagram showing optical response characteristics of the light addressed ferroelectric liquid crystal light valve driven according to the inventive method.

FIG. 17 shows optical response characteristics of the light addressed ferroelectric liquid crystal light valve which is driven according to the present invention in the holographic applications. When a reading light 320 irradiates a reading face of the light addressed ferroelectric liquid crystal light valve, the incident reading light partially reaches the hydrogenated amorphous silicon photoconductive layer through the dielectric mirror in the light valve and is absorbed in the surface region of the photoconductive layer at a depth of about 1 μm because the dielectric mirror has an optical transmittance sufficient to enable the incident reading light to act on the photoconductive layer. The absorption induces pairs of an electron and a hole such that the electrons move to a positive electrode and the holes move to a negative electrode. Since generally the mobility of electrons is several times to several ten times as great as that of the holes in the intrinsic or undoped hydrogenated amorphous silicon, the electrons are dominant in the electrical conductance.

Consequently, under the state where an erasing light in the form of the reading light irradiates, when a transparent electrode formed between the substrate and the hydrogenated amorphous silicon photoconductive layer is held at a positive voltage 317, the induced electrons are drawn to the positive voltage side across the photoconductive layer such that its impedance is abruptly reduced so as to reverse the ferroelectric liquid crystal molecules to thereby switch to a dark or erased state. On the other hand, if that transparent electrode were held at a negative voltage 318, the movable carrier would be holes and the holes could not be effectively moved due to its low mobility so that the photoconductive layer substantially never reduces its impedance. Consequently, the ferroelectric liquid crystal molecules would not switch to the opposite stable state, and therefore the erasing cannot be effected.

When a writing light 321 irradiates a writing face of the light valve which is opposite to the reading face while that electrode is held at the negative voltage 318, pairs of an electron and a hole are induced in a surface region of the photoconductive layer at the writing side such that electron carriers are moved toward the liquid crystal layer across the photoconductive layer so as to locally reduce impedance thereof at a portion selectively irradiated with the writing light. Consequently, a sufficient voltage is applied to the liquid crystal molecules to switch to a bright or writing state 323 opposite to the dark or erasing state, thereby writing an image.

When the hydrogenated amorphous silicon photoconductive layer is held at a zero voltage 319, carriers are not moved to that the written image in the form of a binarized Fourier hologram is memorized and can be read out by an irradiation of the reading light 320. In the zero voltage period, contrast of the recorded Fourier hologram cannot be degraded even in a fast response of μsec order. When the reading light 320 has sufficiently strong irradiation intensity and the dielectric mirror has sufficiently great reflectivity, such zero voltage duration 319 can be eliminated.

Consequently, according to the driving method described above, when the hydrogenated amorphous silicon photoconductive layer is held at the positive voltage, the image recorded on the light valve can be erased by the irradiation of erasing light from the reading side so as to reset or initialize the light valve. On the other hand, when the photoconductive layer is held at the negative voltage, a holographic image can be written in the light valve by the irradiation or writing light from the writing side.

FIG. 14 shows an example of code and input images used for the binary optical correlator in FIG. 16. FIG. 15 shows a correlation image containing a correlation peak when using the code and input images shown in FIG. 14. As shown, the correlation image contains a central zero-order image which is a mirror image of the input or code image, and a pair of a correlation peak and a convolution peak between the input and code images at the opposite sides of the zero-order image. The correlation peak and convolution peak are aligned along a line perpendicular to the wave number vector of the Fourier hologram. The distance from the zero-order image increases when the wave number of the Fourier hologram increases.

Figure 20:
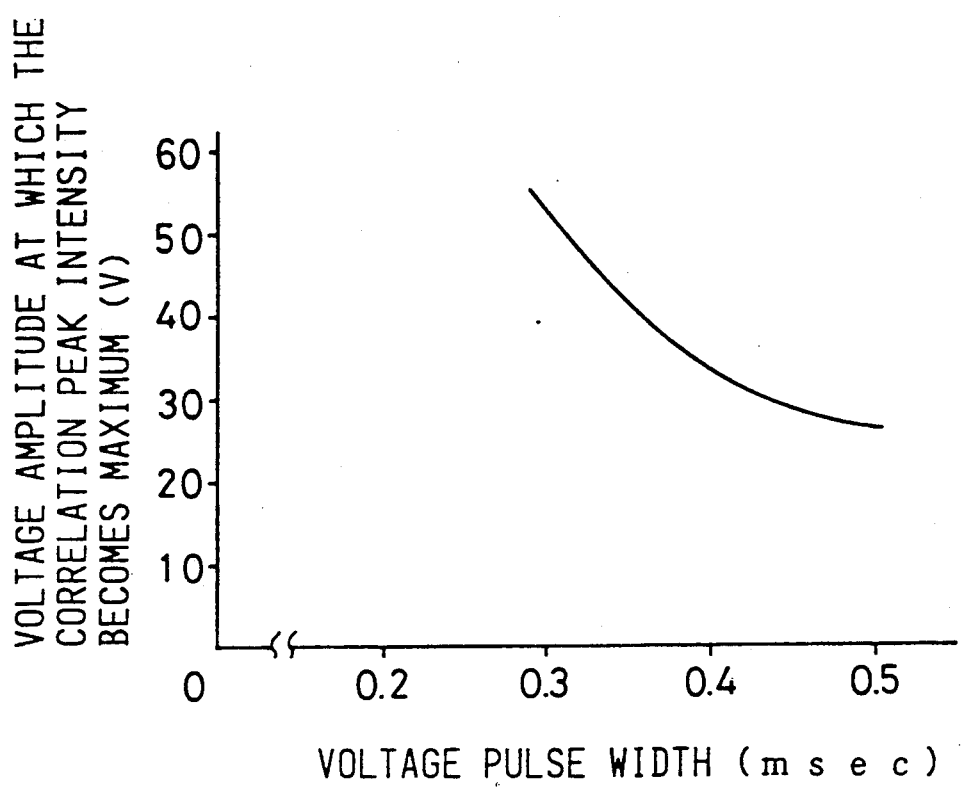
FIG. 20 is a graph showing the relation between the voltage pulse width and the voltage amplitude at which the correlation peak intensity becomes maximum in the holographic binary optical correlator driven according to the inventive method.

A description will now be given of the variation of the correlation peak intensity in the case of changing the amplitude, pulse width or frequency of the driving pulse voltage applied to the light addressed ferroelectric liquid crystal light valve 307, processing the input signal and code signal shown in FIG. 14. Namely, FIG. 20 shows the relation between the voltage pulse width and the voltage amplitude at which the correlation peak intensity has the maximum value when the inventive driving method is applied to the binary optical correlator. As seen from this figure, even if the voltage pulse width is set quite narrow at 0.3 msec., the amplitude can be effectively adjusted to maximize the correlation peak intensity, thereby to achieve quite fast pattern recognition.

Figure 21:
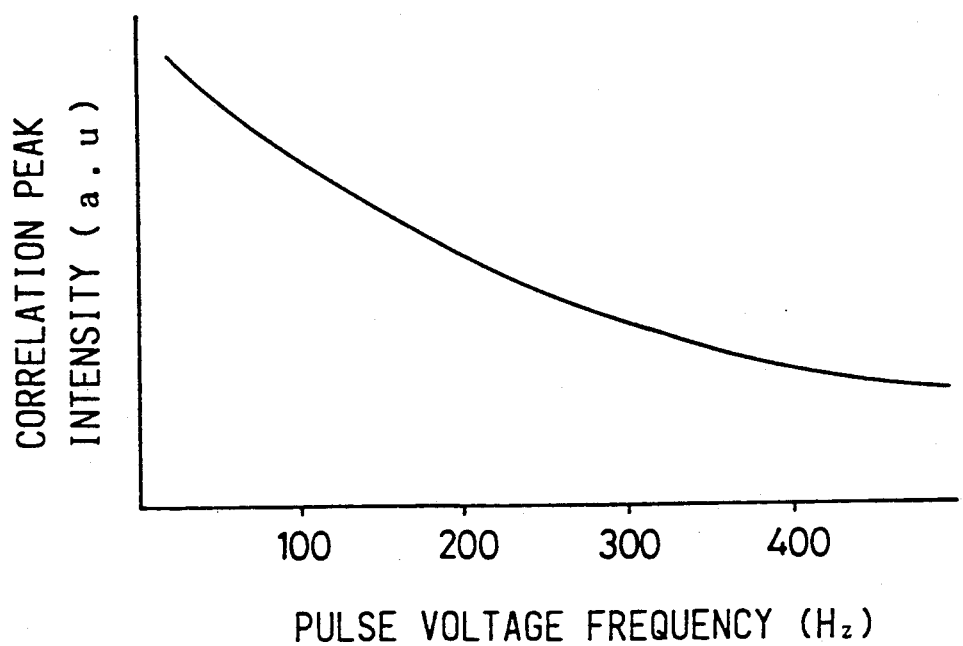
FIG. 21 is a graph showing the relation between the pulse voltage frequency and the correlation peak intensity in the holographic binary optical correlator driven according to the inventive method.

FIG. 21 shows the relation between the frequency of the pulse voltage and the correlation peak intensity when the inventive driving method is applied to the binary optical correlator. As seen from this figure, according to the inventive driving method the binary optical correlator can recognize the pattern in response to high frequency of the pulse voltage, i.e., high frequency of rewriting operation greater than 400 Hz. Practically, as described before, a point where the correlation peak appears can be determined according to the relative position between the code and input images. It is confirmed that the correlation peak can be obtained at a frame rate of more than 30–400 Hz.

Figure 18:
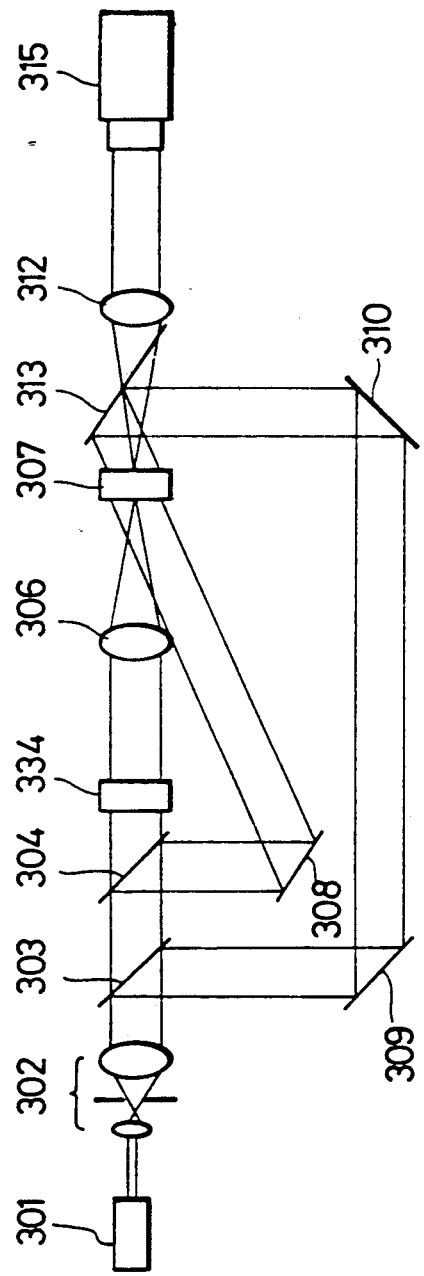
FIG. 18 is a schematic diagram showing the Fourier transform type holographic apparatus driven according to the inventive method.

FIG. 18 is a schematic diagram showing the holography apparatus of the Fourier transform type driven according to the inventive driving method. As shown in FIG. 18, a laser source 301, a beam expander 302, the first beam splitter 303, the second beam splitter 304 and a liquid crystal television 334 constitute means for converting at least one input image into a coherent input image. The first Fourier transform lens 306 constitutes means for converting the coherent input image into a Fourier input image. The second beam splitter 304 and the first mirror 308 constitute means for enabling a coherent reference light of spherical or plane wave to interfere with the Fourier input image to form a Fourier code hologram. A light addressed ferroelectric liquid crystal light valve 307 constitutes means for binarizing the Fourier code hologram and recording the results in the form of a binarized intensity hologram. The light valve 307 is composed of a hydrogenated amorphous silicon photoconductive layer, a reflection layer having a given transmittance, a liquid crystal alignment layer, a pair of ferroelectric liquid crystal layers having bistable memory characteristic between its reflectivity and an applied voltage, means for applying the voltage, and a pair of transparent substrates. The first beam splitter 303, the third mirror 310 and a polarizing beam splitter 313 constitute means for reading the binarized intensity hologram recorded on the light valve 307 by using a coherent reading light of spherical or plane wave. A second Fourier transform lens 312 and a photodetector 315 constitute means for Fourier transforming the read binarized intensity hologram into a reconstructive or output image and for converting this image into a corresponding electric output signal.

The structure of this embodiment differs from the binary optical correlator in the following aspects. Namely, the input image is provided through the liquid crystal television 334. The input image recorded on the light valve 307 is read or reconstructed by a coherent reading light of spherical or plane wave in the opposite direction of the coherent reference light of spherical or plane wave which forms the holographic interference fringes of the input image. The read Fourier input hologram is again Fourier transformed by the second Fourier transform lens 312 on a photodetection face of the photodetector 315 to reconstruct the input image. In such an arrangement, the reading face of the light valve 307 is placed on a front focal plane of the second Fourier transform lens 312, and the photodetection face of the photodetector is positioned on a back focal plane of the lens 312.

In a similar manner shown in FIG. 20, the apparatus in FIG. 18 has the specific relation between the voltage pulse width and the voltage amplitude at which the holographic reconstruction efficiency of the input image has the maximum value when the inventive driving method is applied to the Fourier transform type holography apparatus. Namely, even if the voltage pulse width is set quite narrow at 0.3 msec, the amplitude can be effectively adjusted to maximize the holographic reconstruction efficiency, thereby achieving quite fast holographic reconstruction of the image.

Further, the embodiment in FIG. 18 has the relation, similar to that shown in FIG. 21, between the frequency of the pulse voltage and the holographic reconstruction efficiency of input image when the inventive driving method is applied to the Fourier transform type holography apparatus. According to the inventive driving method, the image can be reconstructed in response to high frequency of the pulse voltage, i.e., high frequency of the rewriting operation greater than 400 Hz. Practically, by moving the input image, it is confirmed that the reconstructed image can move at a frame rate more than 30-400 Hz.

Further, since spatial frequency of the Fourier hologram of the input image to be recorded can be controlled by adjusting the voltage amplitude or voltage pulse width or pulse voltage frequency, fast various image processing can be carried out, such as edge line emphasis or image extraction of moving object or fading of image.

Figure 19:
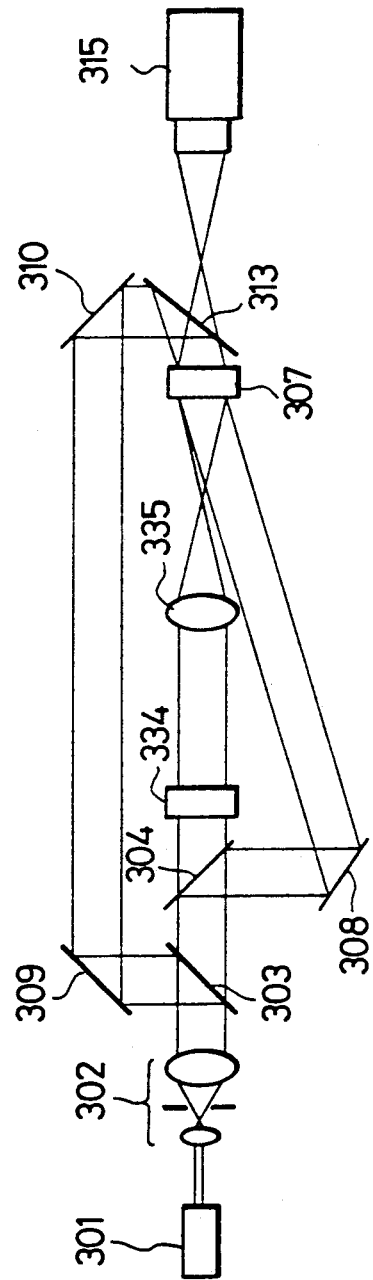
FIG. 19 is a schematic diagram showing the holographic apparatus applied with the inventive driving method.

FIG. 19 is a schematic diagram showing the holography apparatus driven according to the inventive driving method. As shown in FIG. 19, a laser source 301, a beam expander 302, the first beam splitter 303, the second beam splitter 304 and a liquid crystal television 334 constitute means for converting at least one input image into a coherent input image. The second beam splitter 304, the first mirror 308 and an imagery lens 335 constitute means for enabling a coherent reference light of spherical or plane wave to interfere with the coherent input image to form holographic interference fringes. A light addressed ferroelectric liquid crystal light valve 307 constitutes means for binarizing the holographic interference fringes and recording the results in the form of a binarized intensity hologram. The light valve 307 is composed of a hydrogenated amorphous silicon photoconductive layer, a reflection layer having a given transmittance, a pair of liquid crystal alignment layers, a ferroelectric liquid crystal layer having bistable memory characteristic between its reflectivity and an applied voltage, means for applying the voltage, and a pair of transparent substrates. The first beam splitter 303, the second mirror 309, the third mirror 310 and a polarization beam splitter 313 constitute means for reading the binarized intensity hologram recorded on the light valve 307 by using a coherent reading light having a spherical or plane wave. A photodetector 315 constitutes means for converting the read binarized intensity hologram into a corresponding electric output signal.

The embodiment differs from the holographic apparatus of the Fourier transform type shown in FIG. 18 in that an object hologram of the input image is recorded on the light valve 307 instead of recording a Fourier hologram of the input image on the light valve 307 so that the imagery lens 335 is utilized to form the input image directly on the writing face of the light valve 307, and in that the reconstruction of the input image from the object hologram is directly detected by the photodetector 315.

The apparatus in FIG. 19 has the relation similar to that shown in FIG. 20 between the voltage pulse width and the voltage amplitude at which the holographic reconstruction efficiency of the input image has the maximum value when the inventive driving method is applied to the holographic apparatus. Namely, even if the voltage pulse width is set quite narrow at 0.3 msec, the amplitude can be effectively adjusted to maximize the reconstruction efficiency, to achieve quite fast holographic reconstruction of input image.

Further, the embodiment in FIG. 19 shows the relation similar to that shown in FIG. 21 between the frequency of the pulse voltage and the holographic reconstruction efficiency of the input image when the inventive driving method is applied to the holographic apparatus. According to the inventive driving method, the input image can be reconstructed in response to a high frequency of the pulse voltage, i.e., high frequency of rewriting operation greater than 400 Hz. By moving the input image, it is confirmed that the reconstructed input image can move at a frame rate of more than 30-400 Hz.

Figure 22:
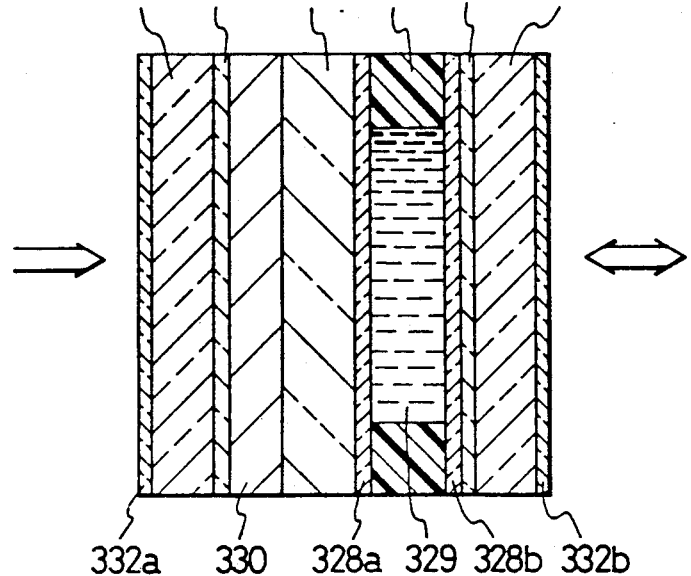
FIG. 22 is a sectional view showing a structure of the light addressed ferroelectric liquid crystal light valve utilized in holographic applications and driven according to the inventive method.

FIG. 22 is a sectional view showing the structure of the binary liquid crystal light valve or recorder using ferroelectric liquid crystal. The light valve has a pair of transparent substrates 326a and 326b made of glass or plastic for sandwiching liquid crystal, the substrates 326a and 326b having transparent electrodes 327a and 327b, respectively, on their inner faces and having alignment layers 328a and 328b, respectively, formed of oblique evaporation of siliconmonooxide at incident angle in the range from 75° to 85° with respect to the normal of the transparent substrates. The transparent substrates 326a and 326b are opposed to each other at a given distance through a spacer 333 to sandwich therebetween ferroelectric liquid crystal layer 329 in contact with the alignment films 328a and 329b. Further, the transparent electrode 327a is laid in order sequentially with a photoconductive layer 330 and a dielectric mirror 331 between the electrode 327a and the alignment film 328a to write optically. Anti-reflection coatings 332a and 332b are formed with the transparent substrate 326a and 326b, respectively on their outer faces of cell. The optical transmission of the dielectric mirror 331 is set such that the light which reaches the hydrogenated amorphous silicon photoconductive layer through the dielectric mirror has an intensity from several tens $\mu W/cm^2$ to one hundred several tens $\mu W/cm^2$.

The conventional apparatus would have a problem in that the hologram cannot be recorded on a hologram recording medium when the hologram interference fringes flicker or vibrate due to air fluctuation or vibration of the system. In the embodiments driven according to the inventive method, such problems can be effectively avoided because writing, erasing and reading of the hologram can be undertaken very quickly.

The driving pulse voltage waveform shown in FIG. 17 may be advantageously superposed with a DC bias component. In the embodiments, the optical system for forming the hologram can be replaced by a Mach-Zehnder or Michelson interferometer, to which the inventive driving method can be applied effectively. Further, the inventive driving method can be applied for a joint transform correlator in which reference and input images are joint Fourier transformed to form Fourier hologram interference fringes, which are again Fourier transformed to produce a correlation image.

As described above, according to the inventive driving method for holographic applications, the holographic correlator and display can be driven quite fast above the video rate, and their output characteristics can be adjusted easily, thereby achieving various advantages in the real-time pattern recognition, image processing and holographic display etc.

Figure 23:
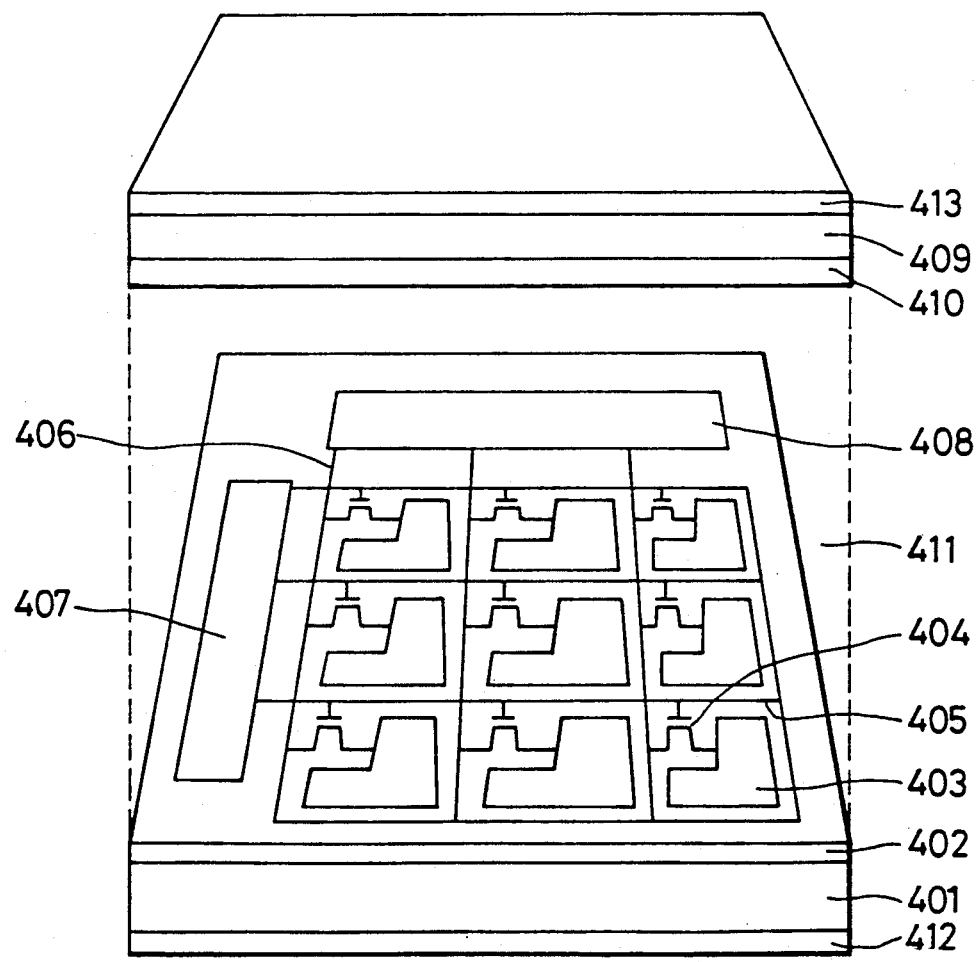
FIG. 23 is an exploded view of the liquid crystal spatial light modulator utilized in various forms for the inventive apparatuses.

FIG. 23 shows another type of the electrically addressed liquid crystal light valve. The light valve in FIG. 23 can be also utilized for a recording light valve, primary image display and so on in the inventive apparatus. The light valve is comprised of a substrate 401 composed, for example, of quartz glass plate. A silicon single crystal film 402 is formed on the substrate 401 in a SOI (silicon on insulator) structure. A plurality of picture elements are formed in the silicon single crystal film 402 in matrix array. Each picture element or pixel is comprised of a picture electrode 403 and a corresponding switching element 404 in the form of a field effect insulating gate type transistor. The transistor has a source electrode connected to the corresponding picture electrode, a drain electrode connected to a signal line 406 and a gate electrode connected to a scanning line 405. Each scanning line 405 is connected to a scanning circuit 407 so as to linescan each row of the switching elements 404. Each signal line 406 is connected to a signal circuit 408 so as to drive a scanned switching elements 404 according to an image signal to select a corresponding picture element. The switching elements 404, the scanning circuit 407 and the driving circuit 408 can be concurrently formed on the silicon single crystal film 402 by LSI technology to thereby fabricate $\mu m$-order of picture elements. An upper substrate 409 is placed on the lower substrate 401 in spaced relation therefrom, and is formed with a counter electrode 410 on its inner face. A liquid crystal layer 411 of TN type or ferroelectric type is sandwiched between the lower and upper substrates 401 and 409. The liquid crystal layer 411 is locally activated between the counter electrode 410 and a selected picture element to switch the incident light through a pair of polarizers 412 and 413.

In this embodiment, the silicon single crystal film 402 is advantageously formed by bonding of silicon single crystal wafer and quartz glass plate and by lapping of the wafer to enable application of LSI fabrication technology to the substrate.

What is claimed is:

1. A holographic apparatus comprising: an interferometer for irradiating an image recording medium concurrently with a reference light having a spherical wave or plane wave form and a signal light containing image information so that the reference light and the signal light interfere with each other to form thereon a hologram; and means for irradiating the hologram by a reading light in the opposite direction of the reference light to reconstruct the image information; wherein the image recording medium comprises a light addressed liquid crystal light valve composed of a photoconductive layer, an optical reflective layer, a pair of liquid crystal alignment layers, a ferroelectric liquid crystal layer having bistable memory characteristics between its optical reflectivity and an applied voltage, means for applying the voltage, and a pair of transparent substrates.

2. A holographic apparatus according to claim 1, wherein the interferometer includes a means disposed in a signal-light-forming optical path for entering the image information, and an imagery optical means for optically Fourier transforming the input image information and then enlarging the Fourier transformed image information to effect image formation on an optical writing face of the light addressed liquid crystal light valve.

3. A holographic apparatus according to claim 1, wherein the interferometer comprises a Mach-Zehnder or Michelson interferometer.

4. An optical interconnection apparatus for recording interference fringes causes between coherent signal input light and reference light on a hologram recording medium to form a hologram and for selectively reconstructing an output light from the hologram to effect optical interconnection between the input and output lights, comprising: an optical system for generating signal input lights and having optical shutters for controlling the transmission of light for generating more than one signal input light; and a hologram recording medium comprising a light addressed liquid crystal light valve composed of a photoconductive layer, an optical reflective layer, a pair of liquid crystal alignment layers, a ferroelectric liquid crystal layer having bistable memory characteristics between its reflectivity and an applied voltage, means for applying the voltage, and a pair of transparent substrates.

5. An optical correlation apparatus for effecting optical correlation processing of two-dimensional images using coherent light so as to automatically carry out recognition and measurement of a given pattern, comprising:

means for converting at least one code image and at least one input image into a corresponding coherent code image and a corresponding coherent input image;

means for independently Fourier transforming the coherent code image and the coherent input image into a Fourier code image and a Fourier input image;

means for enabling a coherent reference light of spherical wave or plane wave form to interfere with the Fourier code image to form a Fourier code hologram;

means including a binary spatial light modulator for converting the Fourier code hologram into a binarized intensity hologram image and recording the same;

means for reading the binarized intensity hologram recorded on the binary spatial light modulator using the Fourier input image; and means for Fourier transforming the read binarized intensity hologram into a correlation image and for converting the correlation image into a corresponding output signal.

6. An optical correlation apparatus according to claim 5, wherein the binary spatial light modulator comprises a light addressed liquid crystal light valve composed of a photoconductive layer, an optical reflection layer, a pair of liquid crystal alignment layers, a ferroelectric liquid crystal layer having bistable memory characteristics of its reflectivity in response to an applied voltage, means for applying the voltage and a pair of transparent substrates.

7. A method of driving an optical correlator having means for converting at least one code image and at least one input image into a corresponding coherent code image and a corresponding coherent input image, means for Fourier transforming the coherent code image and the coherent input image independently of each other into a Fourier code image and a Fourier input image, means for enabling a coherent reference light having a spherical wave or plane wave form to interfere with the Fourier code image to form Fourier holographic fringes, a light addressed ferroelectric liquid crystal light valve for binarizing the Fourier holographic fringes and recording them in the form of a binarized intensity hologram, wherein the light valve comprises a hydrogenated amorphous silicon photoconductive layer, an optical reflection layer having a given transmittance, a pair of liquid crystal alignment layers, a ferroelectric liquid crystal layer having bistable memory characteristics between its reflectivity and an applied voltage, means for applying the voltage and a pair of transparent substrates, means for reading the binarized intensity hologram recorded on the light addressed ferroelectric liquid crystal light valve using a reading light from the Fourier input image, and means for Fourier transforming the read binarized intensity hologram into a correlation image and for photoelectrically converting the correlation image into a corresponding output signal, the method comprising the steps of: continuously irradiating the light addressed ferroelectric liquid crystal light valve with a writing light to form the Fourier holographic fringes; continuously irradiating the light addressed ferroelectric liquid crystal light valve with the reading light to form the Fourier input image; continuously applying to the light addressed ferroelectric liquid crystal light valve a pulse voltage having a voltage polarity relative to the hydrogenated amorphous silicon photoconductive layer which is sequentially and cyclically changed between positive, negative and zero voltages, whereby erasing of the image is carried out when the positive voltage is applied, writing of the image is carried out when the negative voltage is applied and reading of the image is carried out when either the negative voltage or zero voltage is applied; and controlling the pulse voltage to adjust its amplitude, frequency and pulse width when the positive, negative and zero voltages are applied so as to regulate an intensity of the correlation image.

8. A method of driving a holography apparatus of a Fourier transform type having means for converting at least one input image into a corresponding coherent input image, means for Fourier transforming the coherent input image into a Fourier input image, means for enabling a coherent reference light having a spherical wave or plane wave form to interfere with the Fourier input image to form Fourier holographic fringes, a light addressed ferroelectric liquid crystal light valve for binarizing the Fourier holographic fringes and recording them in the form of a binarized intensity hologram, the light valve being composed of a hydrogenated amorphous silicon photoconductive layer, an optical reflection layer having a given transmittance, a pair of liquid crystal alignment layers, a ferroelectric liquid crystal layer having bistable memory characteristics between its reflectivity and an applied voltage, means for applying the voltage and a pair of transparent substrates, means for reading the binarized intensity hologram recorded on the light addressed ferroelectric liquid crystal light valve using a coherent reading light having spherical wave or plane wave form, and means for Fourier transforming the read binarized intensity hologram image into a reconstructed image and for photoelectrically converting the reconstructed image into a corresponding output signal, the method comprising the steps of: continuously irradiating the light addressed ferroelectric liquid crystal light valve with a writing light which forms the Fourier holographic fringes and with the coherent reading light of spherical or plane wave form; continuously applying to the light addressed ferroelectric liquid crystal light valve a pulse voltage having a voltage polarity relative to the hydrogenated amorphous silicon photoconductive layer which is sequentially and cyclically changed between positive, negative and zero voltages, whereby erasing of the image is carried out when the positive voltage is applied, writing of the image is carried out when the negative voltage is applied and reading of the image is carried out when either the negative voltage or the zero voltage is applied; and controlling the pulse voltage to adjust its amplitude, frequency and pulse width when the positive, negative and zero voltages are applied so as to regulate an intensity or quality of the reconstructed image.

9. A method of driving a holographic apparatus having means for converting at least one input image into a corresponding coherent input image, means for enabling a coherent reference light having a spherical wave or plane wave form to interfere with the coherent input image to form holographic fringes, a light addressed ferroelectric liquid crystal light valve for binarizing the holographic fringes and recording them in the form of a binarized intensity hologram, the light valve being composed of a hydrogenated amorphous silicon photoconductive layer, an optical reflection layer having a give transmittance rate, a pair of liquid crystal alignment layers, a ferroelectric liquid crystal layer having bistable memory characteristics between its reflectivity and an applied voltage, means for applying the voltage and a pair of transparent substrates, means for reading the binarized intensity hologram recorded on the light addressed ferroelectric liquid crystal light valve using a coherent reading light of spherical or plane wave form, and means for converting the read binarized intensity hologram into a corresponding output signal, the method comprising the steps of: continuously irradiating the light addressed ferroelectric liquid crystal light valve with a writing light to form the holographic fringes; continuously irradiating the light addressed ferroelectric liquid crystal light valve with the coherent reading light of spherical or plane wave form; continuously applying to the light addressed ferroelectric liquid crystal light valve a pulse voltage having a voltage polarity relative to the hydrogenated amorphous silicon photoconductive layer which is sequentially and cyclically changed between positive, negative and zero voltages, whereby erasing of the image is carried out when the positive voltage is applied, writing of the image is carried out when the negative voltage is applied and reading of the image is carried out when the negative voltage or zero voltage is applied; and controlling the pulse voltage to adjust its amplitude, frequency and pulse width when the positive, negative and zero voltages are applied so as to regulate an intensity or quality of the image.

* * * * *